United States Patent
Parmentier

(10) Patent No.: US 11,406,915 B2
(45) Date of Patent: Aug. 9, 2022

(54) MULTICAPILLARY PACKING CHROMATOGRAPHY METHOD

(71) Applicant: Francois Parmentier, St Martin d'Heres (FR)

(72) Inventor: Francois Parmentier, St Martin d'Heres (FR)

(73) Assignee: SEPARATIVE, Solaize (FR)

( * ) Notice: Subject to any disclaimer, the term of this patent is extended or adjusted under 35 U.S.C. 154(b) by 0 days.

(21) Appl. No.: 15/514,918

(22) PCT Filed: Sep. 29, 2015

(86) PCT No.: PCT/EP2015/072474
§ 371 (c)(1),
(2) Date: Mar. 28, 2017

(87) PCT Pub. No.: WO2016/050797
PCT Pub. Date: Apr. 7, 2016

(65) Prior Publication Data
US 2017/0259190 A1    Sep. 14, 2017

(30) Foreign Application Priority Data

Sep. 29, 2014   (FR) ...................................... 1459176

(51) Int. Cl.
*B01D 53/02*        (2006.01)
*B01D 15/22*        (2006.01)
(Continued)

(52) U.S. Cl.
CPC ............. *B01D 15/22* (2013.01); *B01D 15/40* (2013.01); *B01D 53/025* (2013.01);
(Continued)

(58) Field of Classification Search
CPC .. B01D 15/22; B01D 15/40; B01D 2253/104; B01D 2253/106; B01D 2253/306;
(Continued)

(56) References Cited

U.S. PATENT DOCUMENTS

2013/0075317 A1*  3/2013  Parmentier ........ B01J 20/28045
                                                        210/198.2
2014/0349839 A1*  11/2014 Parmentier ........ B01D 15/1892
                                                        502/64

FOREIGN PATENT DOCUMENTS

WO      2011/114017 A2      9/2011
WO    WO-2013064754 A1  *  5/2013

OTHER PUBLICATIONS

Boardman et al., "The Diffusion of pairs of gases with molecules of equal mass", Proceedings of the Royal Society of London, Series A, Mathematical and Physical Sciences, vol. 162, No. 911, Oct. 15, 1937, pp. 511-520.

(Continued)

*Primary Examiner* — Christopher P Jones
(74) *Attorney, Agent, or Firm* — Womble Bond Dickinson (US) LLP

(57) ABSTRACT

Chromatography method in which a gaseous, liquid or supercritical mobile phase containing species to be separated is circulated through a packing, said packing being characterized in that: —it comprises a plurality of capillary ducts extending in the packing between an upstream face through which the mobile phase enters the packing and a downstream face through which the mobile phase leaves the packing—the material of the walls comprises a first population of connected pores, providing passages from one duct to the next enabling molecular diffusion to take place between adjacent ducts, pores having a mean diameter ($d_{pore}$) of greater than 2 times the molecular diameter of at (Continued)

least one species to be separated—the diameter of the ducts is less than 50 μm.

13 Claims, 18 Drawing Sheets

(51) Int. Cl.
  B01J 20/283    (2006.01)
  B01J 20/28     (2006.01)
  B01J 20/284    (2006.01)
  B01J 20/285    (2006.01)
  B01D 15/40     (2006.01)
  B01J 20/10     (2006.01)
  B01J 20/291    (2006.01)
  B01J 20/30     (2006.01)

(52) U.S. Cl.
  CPC ........... B01J 20/103 (2013.01); B01J 20/283 (2013.01); B01J 20/284 (2013.01); B01J 20/28004 (2013.01); B01J 20/285 (2013.01); B01J 20/28016 (2013.01); B01J 20/28042 (2013.01); B01J 20/28047 (2013.01); B01J 20/28078 (2013.01); B01J 20/28083 (2013.01); B01J 20/291 (2013.01); B01J 20/3021 (2013.01); *B01D 2253/104* (2013.01); *B01D 2253/106* (2013.01); *B01D 2253/306* (2013.01); *B01D 2253/308* (2013.01); *B01J 2220/54* (2013.01)

(58) Field of Classification Search
  CPC ............. B01D 2253/308; B01D 53/025; B01J 20/103; B01J 20/28004; B01J 20/28016; B01J 20/28042; B01J 20/28047; B01J 20/28078; B01J 20/28083; B01J 20/283; B01J 20/284; B01J 20/285; B01J 20/291; B01J 20/3021; B01J 2220/54
  See application file for complete search history.

(56) References Cited

OTHER PUBLICATIONS

Chromatography, "List of major Chromatography and related journals," Available Online at <https://www.omicsonline.org/chromatography-journals-conferences-list.php>, Retrieved on Aug. 24, 2020, 3 pages.

Davis et al., "Pore structure evolution in silica gel during aging/drying Part I, Temporal and thermal aging", Journal of Non-Crystalline Solids, vol. 142, May 1992, pp. 189-196.

Davis et al., "Pore structure evolution in silica gel during aging/drying Part II, Effect of Pore fluids", Journal of Non-Crystalline Solids, vol. 142, May 1992, pp. 197-207.

Deshpande et al., "Pore structure evolution in silica gel during aging/drying. Part III. Effects of Surface Tension", Journal of Non-Crystalline Solids, vol. 144, Jul. 1992, pp. 32-44.

International Preliminary Report on Patentability received for PCT Patent Application No. PCT/EP2015/072474, dated Apr. 13, 2017, 16 pages (9 pages of English Translation and 7 pages of Original Document).

International Search Report and Written Opinion received for PCT Patent Application No. PCT/EP2015/072474, dated Dec. 2, 2015, 18 pages (9 pages of English Translation and 9 pages of Original Document).

Matyka et al., "Tortuosity-porosity relation in the porous media flow", Physical Review E, vol. 78, Sep. 2008, pp. 1-8.

Preliminary Research Report received for French Application No. 1459176, dated Jun. 18, 2015, 3 pages (1 page of French Translation Cover Sheet and 2 pages of original document).

Sachse, Alexander, "Synthèses de microréacteurs à base de monolithes 30 siliciques et zéolithiques à porosité hiérarchique pour le développement de la catalyse en flux, (Syntheses of microreactors based on silicic and zeolithic monoliths with hierarchical porosity for development of flow catalyses)", Ecole Nationale Supérieure de Chimie de Montpellier, Oct. 26, 2011, 284 pages of Original Document Only.

Tonnelat et al., "Méthode optique de mesure des coefficients de diffusion avec un diaphragme poreux vertical", J. Chim. Phys., vol. 54 1957, pp. 920-923 (Only First page of the article submitted).

Wilke et al., "Correlation of Diffusion Coefficients in Dilute Solutions", Aiche Journal, vol. 1, No. 2, Jun. 1, 1955, pp. 264-270.

\* cited by examiner

FIGURE 16
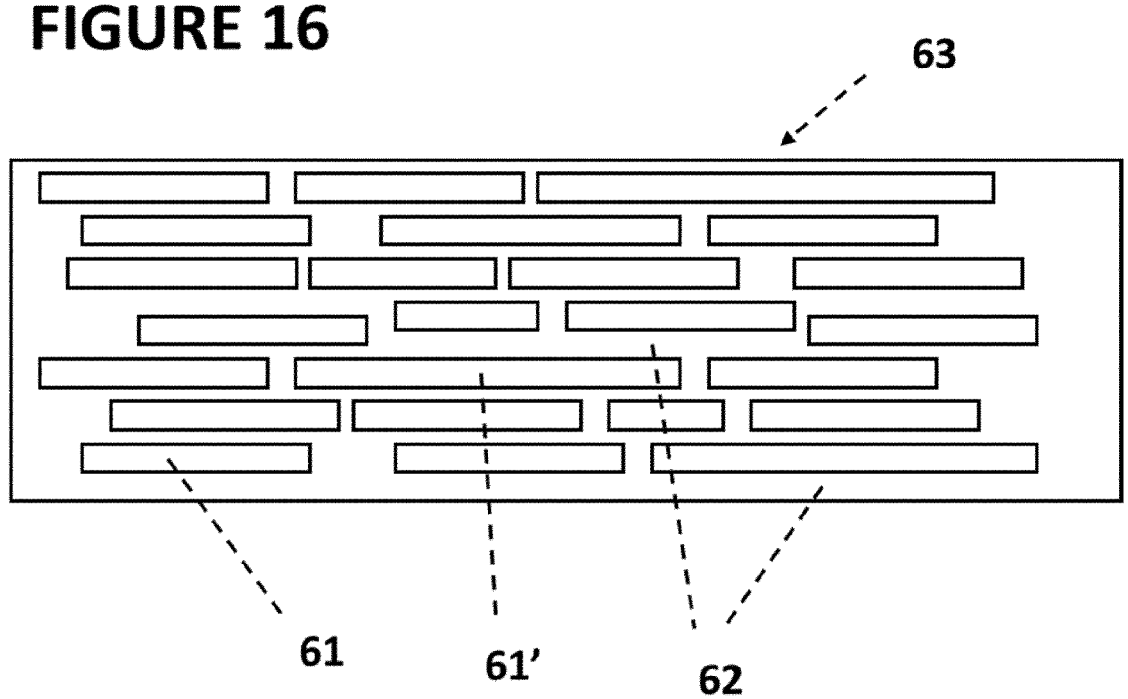
FIGURE 17
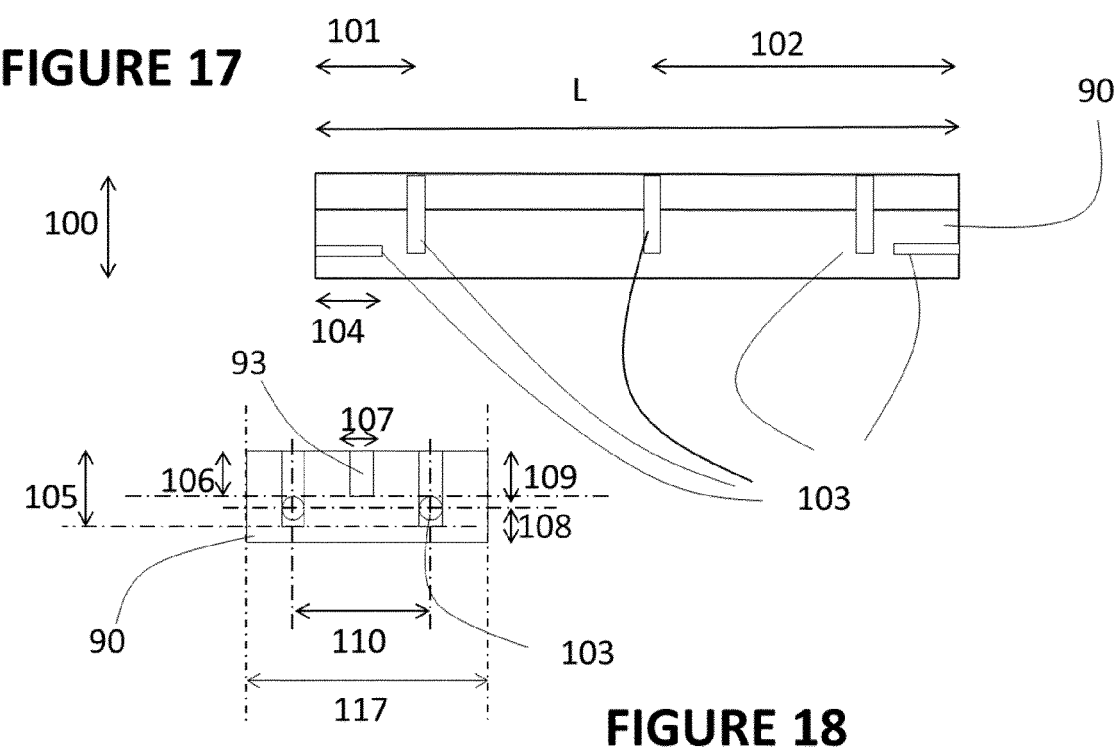
FIGURE 18

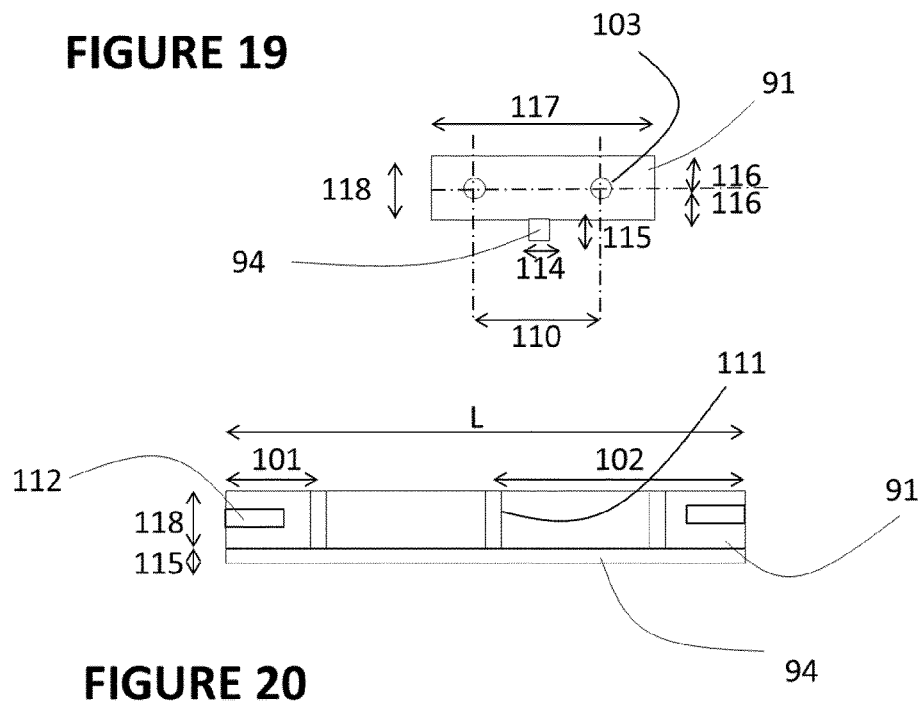
FIGURE 19
FIGURE 20
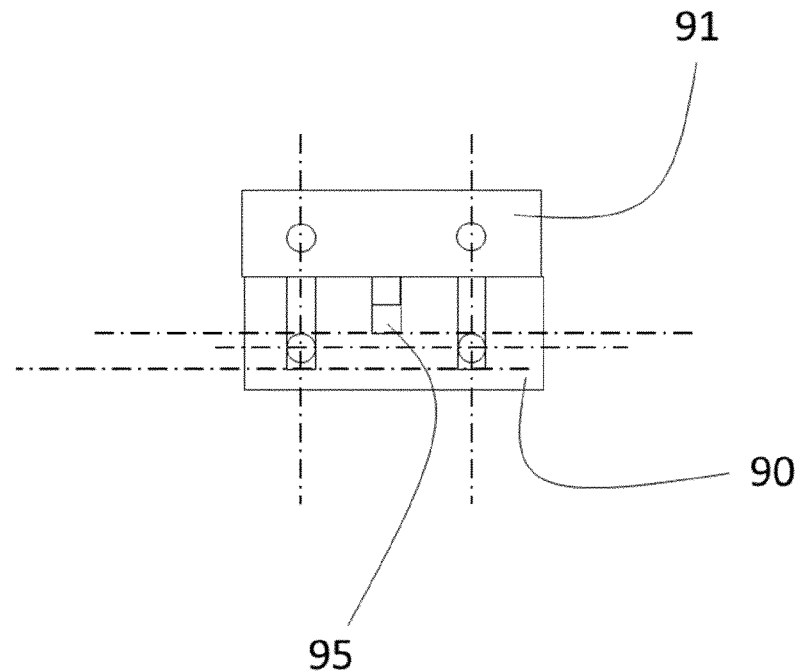
FIGURE 21

MULTICAPILLARY PACKING CHROMATOGRAPHY METHOD

FIELD OF THE INVENTION

The present invention relates to the optimization of the morphology and of the porosity of multicapillary packings in operation.

BACKGROUND OF THE INVENTION

Chromatography is a particular technique, which has its advantages and specific constraints and is thereby differentiated from the other related techniques by applying solid and fluid packings, like for adsorption and heterogeneous catalysis.

In adsorption it is sought to retain compound of a fluid effluent on the surface of which it is adsorbed via an isotherm, or on which it reacts. It is sought to purify the fluid. High specific surface areas are required. Beds with high capacity are needed. The efficiency of the packing is not critical (number of theoretical plates) and the use of beds of granules with diameters from 1 to 2 mm is preferred. Indeed, the efficiency only has negligible influence on the dimensioning of the bed in so far that it will only act on the stiffness of the percolation front, which is good as soon as one attains about 20 theoretical plates. It is then necessary to regenerate the adsorbent for a combination of means, temperature or chemical reaction, which removes the adsorbed or combined impurities. The operation is therefore sequential but the cycle times are numbered in days or in weeks. The mass of the bed is dimensioned. The pressure drops are low.

In catalysis, it is sought to carry out a chemical reaction on the surface of the solid. It is desired that the reagents remain for an optimum time in contact with the solid. There again these are adsorption and chemical reaction forces. Dwelling time criteria are of interest. The logic with number of theoretical plates is inoperative. The regularity of the packing is a factor from among others and is secondary relatively to the catalytic selectivity. It is not sought to separate molecules. The pressure drops are low.

In chromatography, several components present in a fluid load admitted sequentially according to a short time interval evaluated in minutes, by propagating it from an inlet point to an outlet point of a solid column under the effect of an eluant fluid. The obtained separation may be obtained by a very large variety of forces which compete with the driving effect of the eluant, sharing, adsorption, steric interactions, ionic interactions, etc. . . . . This method provides a high resolving power, each component behaving differently. In order to enhance this resolving power, the column must have a high number of theoretical plates, for example 1000. This also means that the diffusion resistances have to be minimized and therefore that the diffusion distances are short, and that the column must be long. These combined factors ensure that chromatography is a technique which claims excellent regularity of the flow and therefore of the packing, and a small characteristic dimension of the latter, leading to pressure drops which become rapidly critical with particle solids. These are the problems which have to be solved in chromatography.

In patent application WO 2011/114017 is described a multicapillary monolith.

This invention describes a monolith mainly consisting of silica or alumina for which the walls are porous so as to allow rapid equilibration of the composition between adjacent conduits and its application to chromatography.

In particular, a method for obtaining this monolith is described therein, characterized in that precursor wires are coated in a porous matrix, and in that the fibers are destroyed only to leave the matrix subsist. As structural materials mention is made of sols or gels of silica or alumina.

This document and the following however do not describe the hydrodynamic conditions, diffusional at a molecular level, and structural giving the possibility of making the most out of a porous multicapillary packing.

In chromatography on a bed of particles, the fluid streams mix again together by convection and form a continuum. In a multicapillary packing, the fluid streams are independent on the convection level and only communicate through molecular diffusion. The porous structure of the walls therefore represents a fundamental nature of the efficiency of these packings.

The result of this is the need to characterize and optimize the nature and the distribution of the porosity of the material separating the conduits.

The following publications: K Nakanishi, Phase separation in silica sol-gel system containing polyacrylic acid, Journal of non crystalline Solids 139 (1992, 1-13 and 14-24, K. Nakanishi, Phase separation in Gelling Silica-Organic Polymer Solution: Systems Containing Poly(sodium styrenesulfonate), J. Am. Ceram. Soc. 74 (10) 2518-2530-30 (1991) deal with materials having two families of pores. The problem is to produce a monolithic packing in silica comprising two families of pores, on the one hand interconnected macropores through which may flow a liquid relatively freely, and on the other hand a family of mesopores or micropores generating specific surface area, and therefore the activity towards an exchange of material.

The following publication: Deen, W. M. Hindered transport of large molecules in liquid-filled pores, A.I.Ch.E Journal, 33,1409-1425 describes a relationship between the diffusivity in pores and the radius of molecules in liquid phases.

On the other hand, relationships are known relating the mean free path of a molecule in a gas phase and the diffusional conditions of this molecule in a porous matrix. In particular it is known that when the size of the pore becomes close to the mean free path of a molecule, diffusion enters the Knudsen conditions and is thereby slowed down.

Therefore a need appears for defining the size of the pores and the dimensioning and operational parameters of a multicapillary packing so as to obtain optimum efficiency for a solute and given hydrodynamic operating conditions.

Short Description of the Invention

An object of the invention is to define the properties of a multicapillary packing giving the possibility of obtaining optimum efficiency for a solute and given hydrodynamic operating conditions.

For this purpose, the invention proposes a chromatography method in which a gas, liquid or supercritical mobile phase is circulated, containing species to be separated through a packing comprising a stationary phase, said packing being characterized in that:

it includes a plurality of capillary conduits extending in the packing between a so-called upstream face through which the mobile phase penetrates into the packing and a so-called downstream face through which the mobile phase emerges from the packing, the material of the walls of said conduits includes a
network of connected pores, said pores forming passages from one conduit to the other allowing molecular diffusion to be operated between adjacent conduits, said pores having an average diameter greater than twice the molecular diameter of at least one species to be separated, the average diameter of the conduits is less than 50 µm.

According to an embodiment, the capillary conduits cross the packing right through between the upstream face and the downstream face. According to another embodiment, the capillary conduits are included in the packing and have at least one end opening inside said packing.

In a particularly advantageous way, the ratio, called "relative dispersion height", of the height of the theoretical plate ($H_{disp}$) due to inhomogeneities of the packing over the height of the total theoretical plate (H) of the packing is less than 0.66, preferably less than 0.3 and still even preferred less than 0.1.

In said method:
the species to be separated have a molecular radius $R_h$ in the elution solvent, a molecular diffusion coefficient $D_0$ in the elution solvent, a molecular diffusion coefficient $D_s$ in or on the stationary phase, a sharing coefficient K between the stationary phase and the elution solvent, a retention factor k' in the chromatographic column, and
the packing includes conduits of an average diameter $d_c$ separated with walls of an average thickness $d_e$ for which the irregularity is defined by a standard deviation of the diameter $d_c$ reduced to its average SigmaD, by a standard deviation of the thickness $d_e$ reduced to its average SigmaE, and by a standard deviation of the length of the conduits reduced to its average SigmaL,
the constitutive porous material of the walls has a porous volume fraction P, a volume fraction of stationary phase $f_{VolStat}$ or a specific adsorption surface area S, a tortuosity T, and the network of connected pores has a diameter $d_{pore}$,
the mobile phase flows with an average velocity $v_c$ in the conduits and
the theoretical plate height ($H_{disp}$) due to the inhomogeneities of the packing is defined by the relationship:

$$H_{disp} = 0.778 * \frac{v_0 * (FKD * SigmaD^2 + FKE * SigmaE^2 + FKL * SigmaL^2) * (d_c + d_e)^2}{FDiff * FDil * (1 + k') * 2}$$

Advantageously the so-called "relative dispersion height" ratio of the theoretical plate height ($H_{disp}$) due to the inhomogeneities of the packing over the total theoretical plate height (H) of the packing is calculated with the efficiency optimum of the packing given by the curve of VanDeemter.

Advantageously, the conduits have an average diameter of less than 30 µm, and preferably less than 10 µm.

The packing advantageously comprises at least one portion for which:
the capillary conduits are substantially rectilinear and parallel with each other
the conduits have a substantially uniform section relatively to each other,
the section of each conduit is regular over the whole of its length,
the whole of the conduits cross right through said portion.

The network of pores of the packing has an average diameter greater than 5 times the molecular diameter of the species to be separated and preferably greater than 10 times the molecular diameter of the species to be separated.

According to an embodiment of the invention, the mobile phase is in the condensed condition and said network of pores has an average diameter of pores greater than 2 nanometers, preferably greater than 10 nanometers, and even more preferentially greater than 100 nanometers.

According to another embodiment of the invention, the mobile phase is in the gas state and the pores have a diameter greater than the mean free path of the molecules.

SHORT DESCRIPTION OF THE DRAWINGS

Other features and advantages of the invention will emerge from the detailed description which will follow, with reference to the appended drawings wherein.

Figure 4:
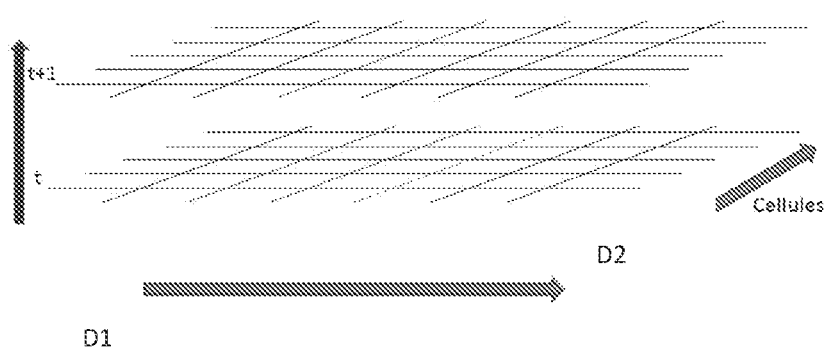

FIG. 4 schematically shows the numerical scheme used for simulating the behavior of the multicapillary packings.

Figure 5:
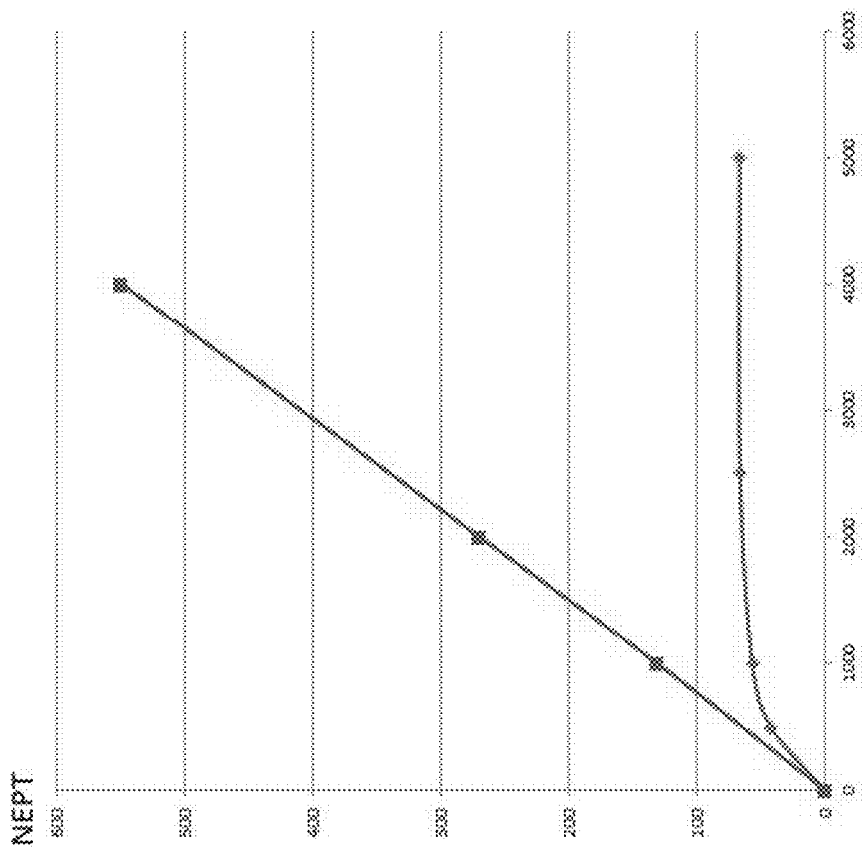

FIG. 5 shows the relationship between NEPT (Number of Theoretical plates) and the length of the packing for multicapillary porous monoliths and non-porous multicapillary monoliths.

Figure 6:
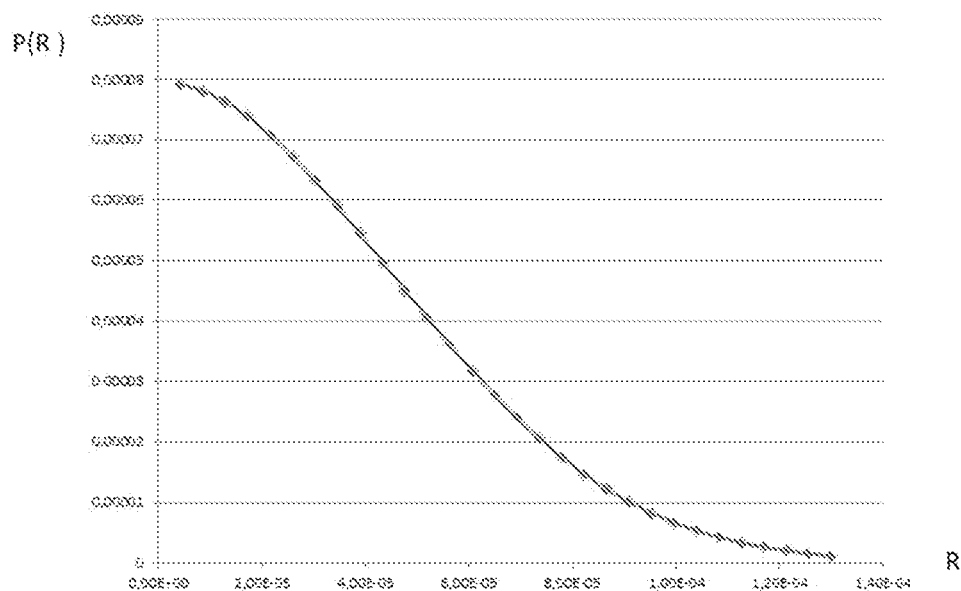

FIG. 6 shows the aspect of the transient diffusional phenomena.

Figure 7:
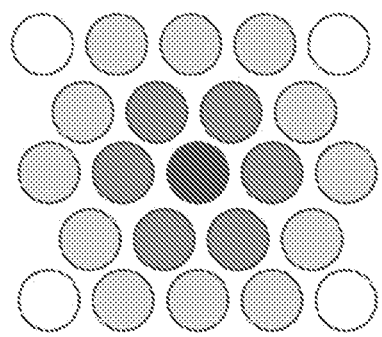

FIG. 7 shows the same diffusive phenomenon projected on a set of neighboring conduits.

Figure 8:
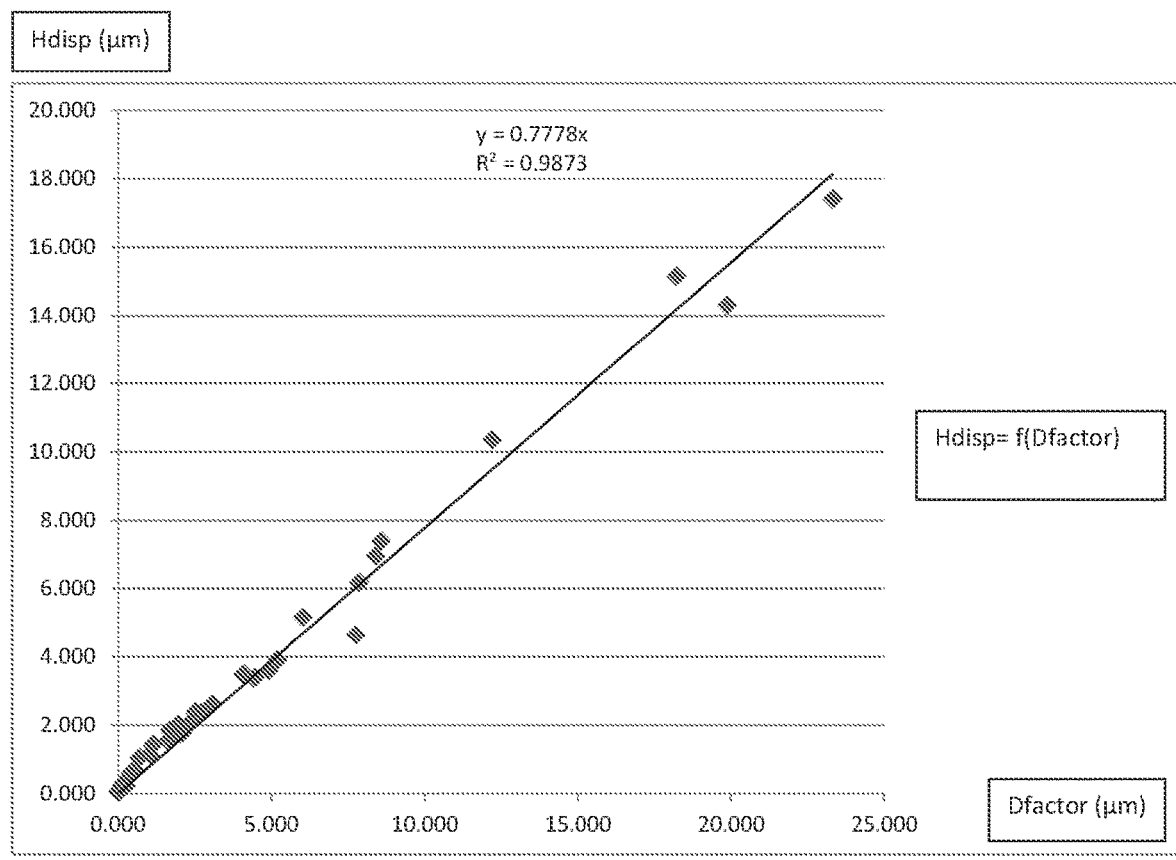

FIG. 8 shows the correlation between Hdisp and Dfactor.

Figure 9:
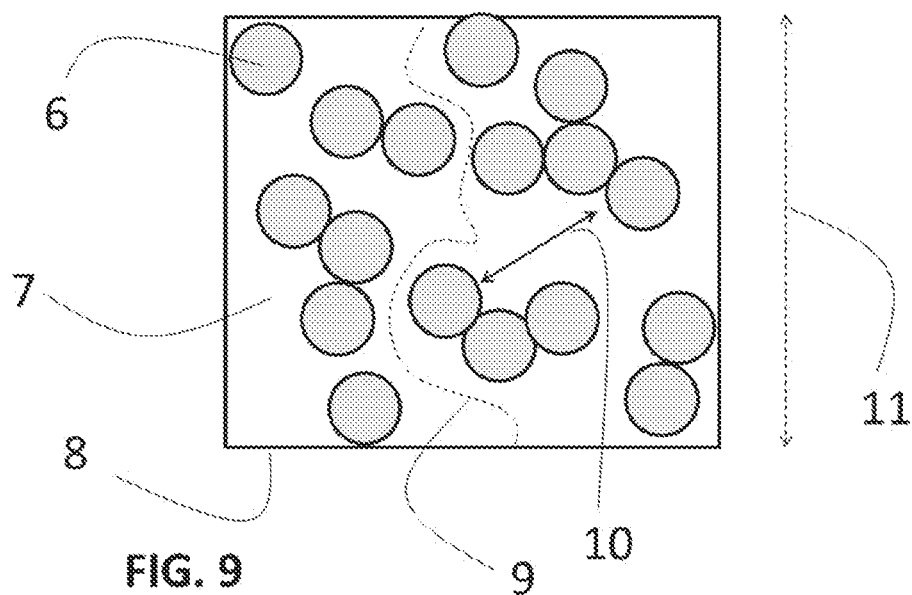

FIG. 9 exemplifies the nature of the numbers characterizing a porous medium.

Figure 10:
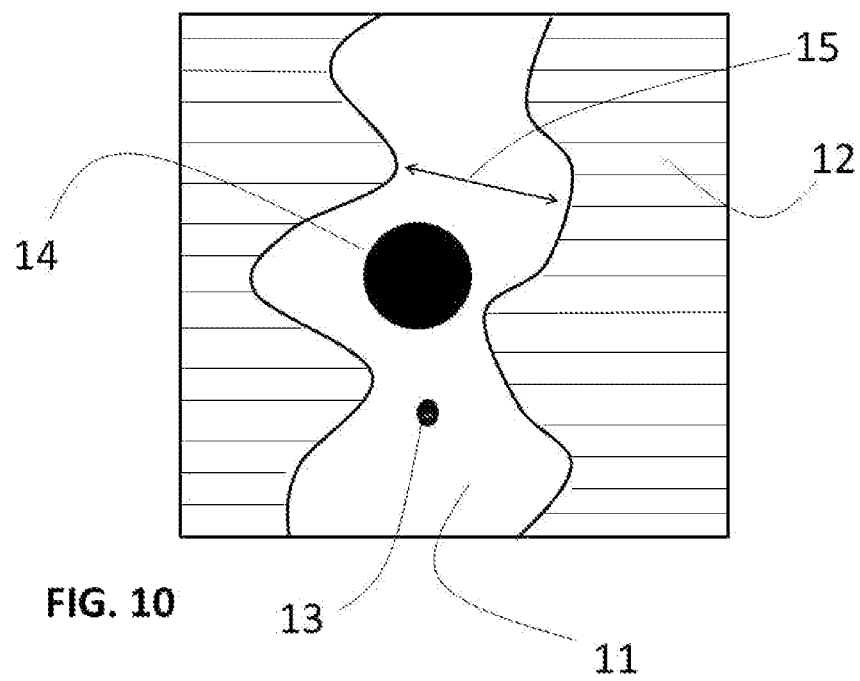

FIG. 10 schematizes the characteristic sizes of the molecules interacting with the walls in a porous medium.

Figure 11:
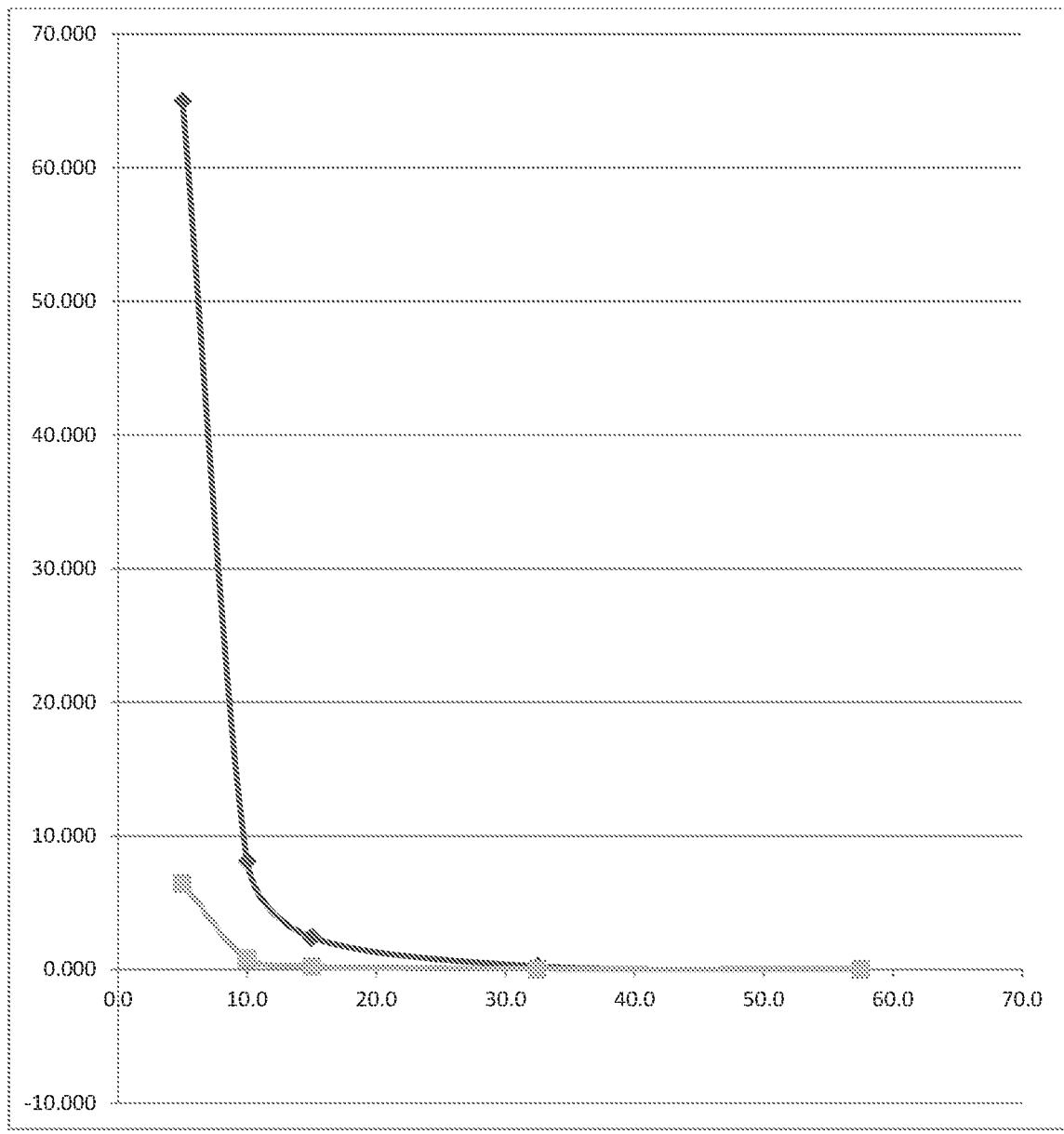

FIG. 11 compares the pressure drop of multicapillary and particulate packings.

Figure 12:
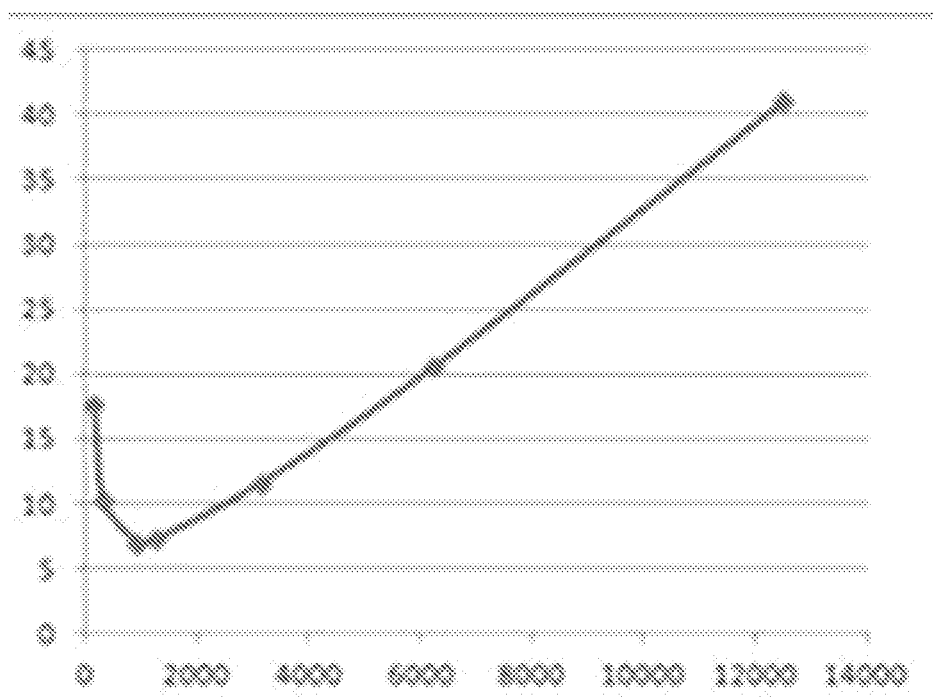

FIG. 12 shows a Van Deemter curve obtained by simulation.

Figure 13:
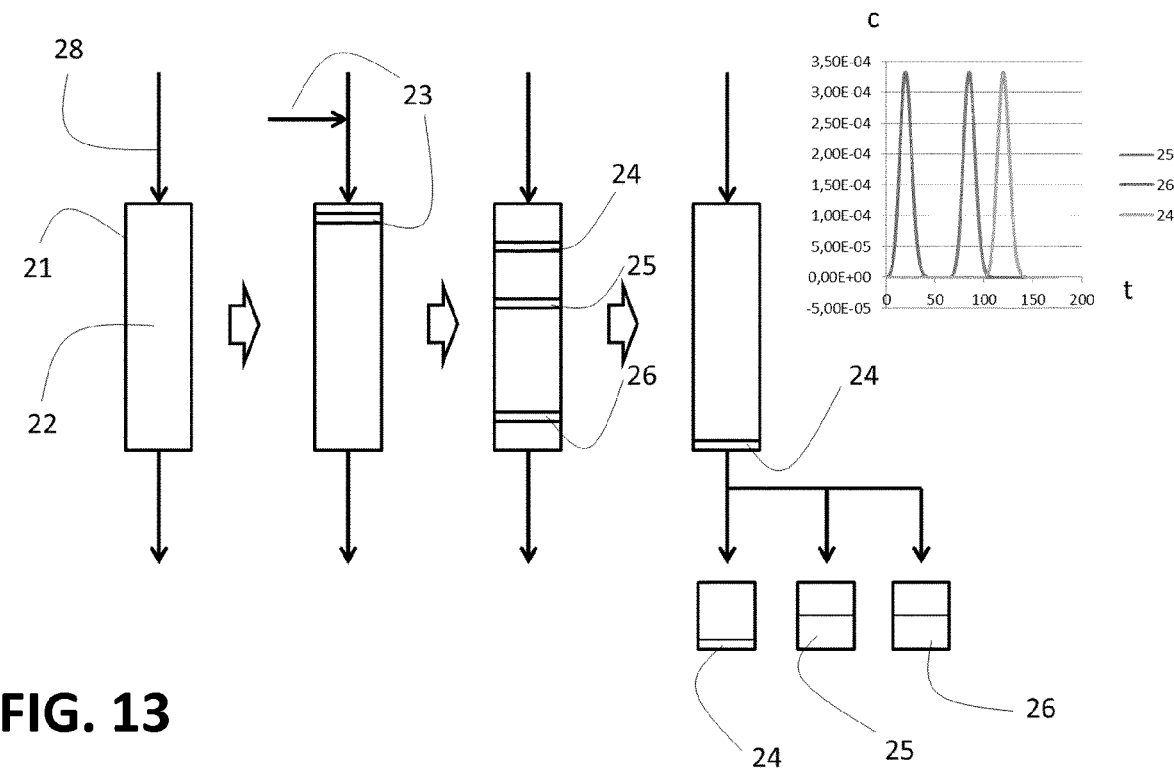

FIG. 13 describes an elution chromatography method.

Figure 14:
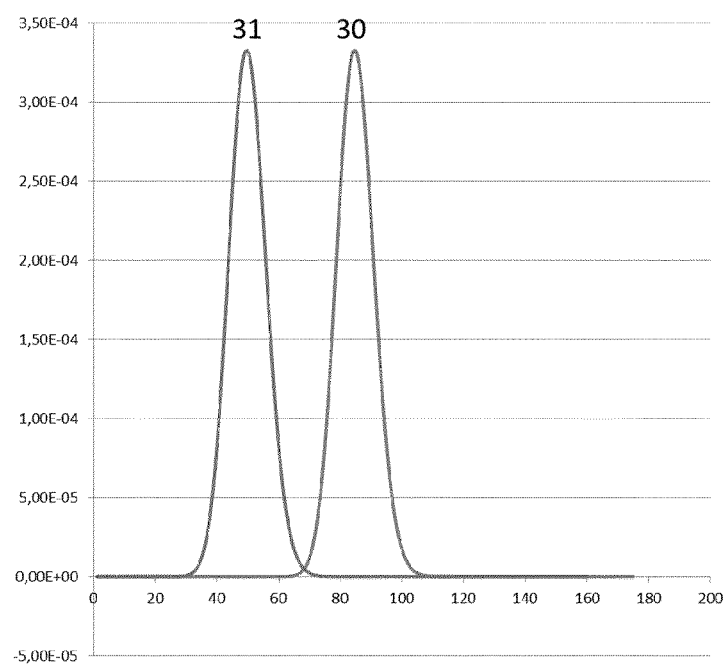

FIG. 14 schematically illustrates a simulation by computer of the separation of two chemical species on a multicapillary packing with porous walls, for which the diameter of the communicating pores is greater than twice the molecular diameter of both of these species.

Figure 15:
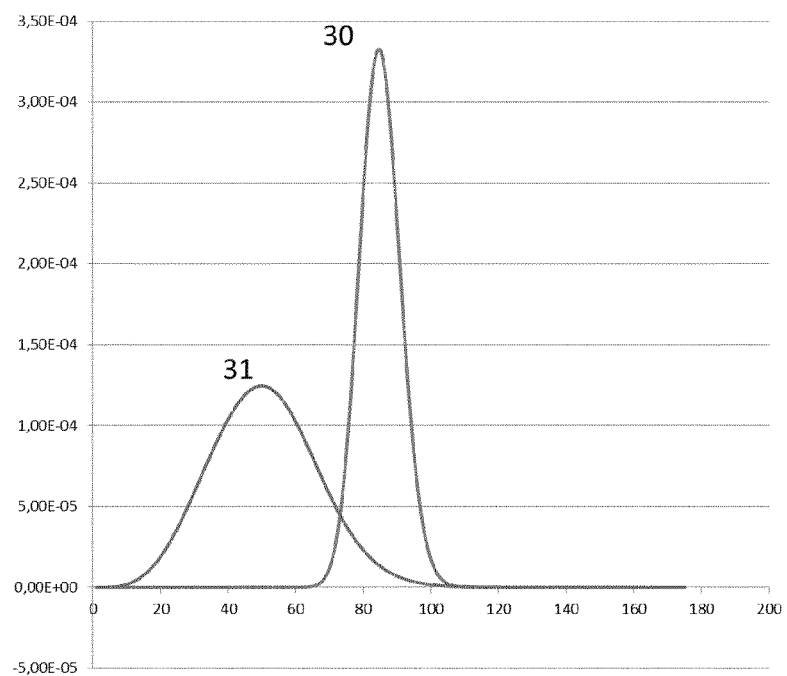

FIG. 15 schematically illustrates a simulation by computer of the separation of the same chemical species on a packing having identical dimensional characteristics with the one used in the simulation of FIG. 14 but for which the diameter of the communicating pores is greater than twice the molecular diameter of a species and is less than twice the molecular diameter of another species.

FIG. 16 illustrates a sectional view along a direction parallel to its major axis of an alternative of a packing for chromatography according to the invention in which the conduits are included in a porous monolithic mass and are stacked and juxtaposed.

Figure 25:
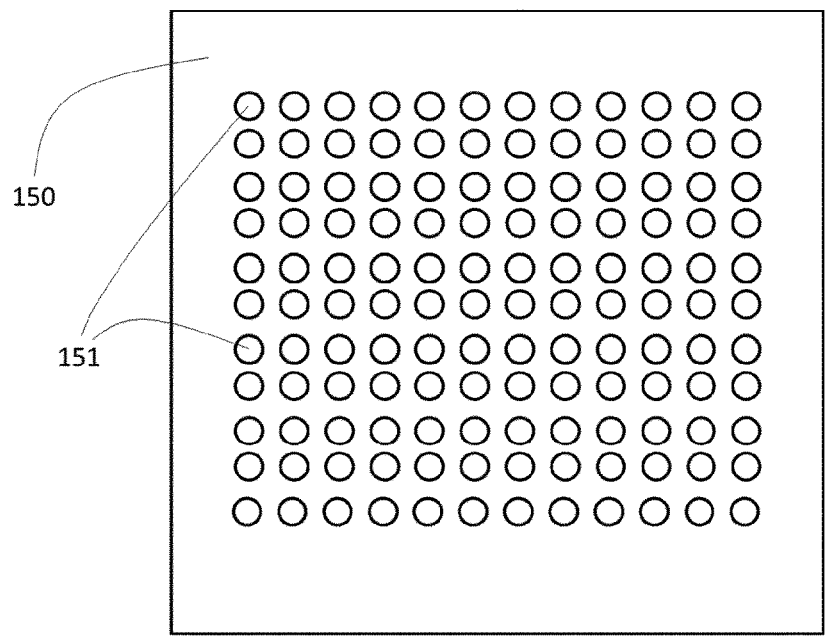
Figure 26:
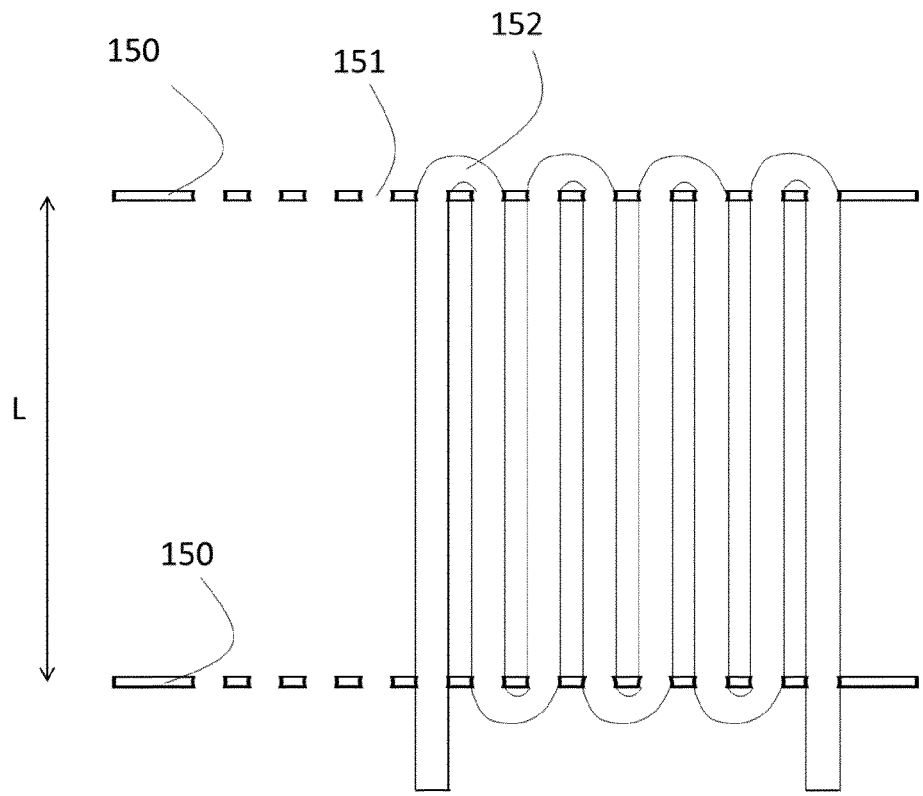
Figure 27:
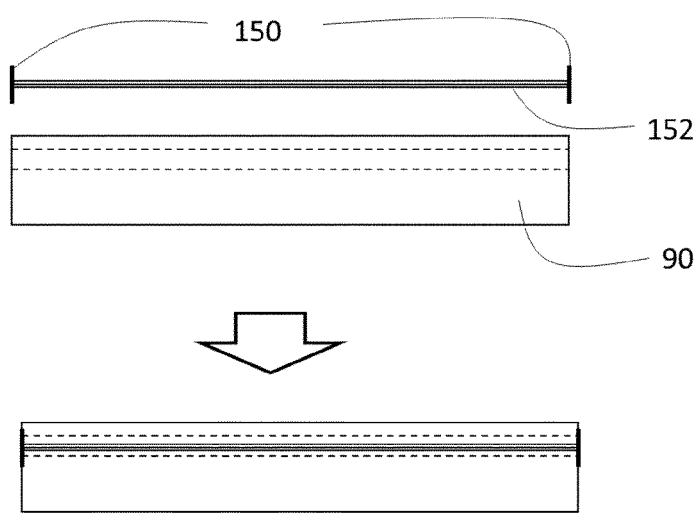

FIGS. 17 to 24 are views of the construction of a chromatography column,

FIGS. 25 and 26 illustrate a mode of assembly of precursor wires of the conduits of a monolith, FIG. 27 schematically illustrates the assembling of the bundle of wires in the part 90.

Figure 28:
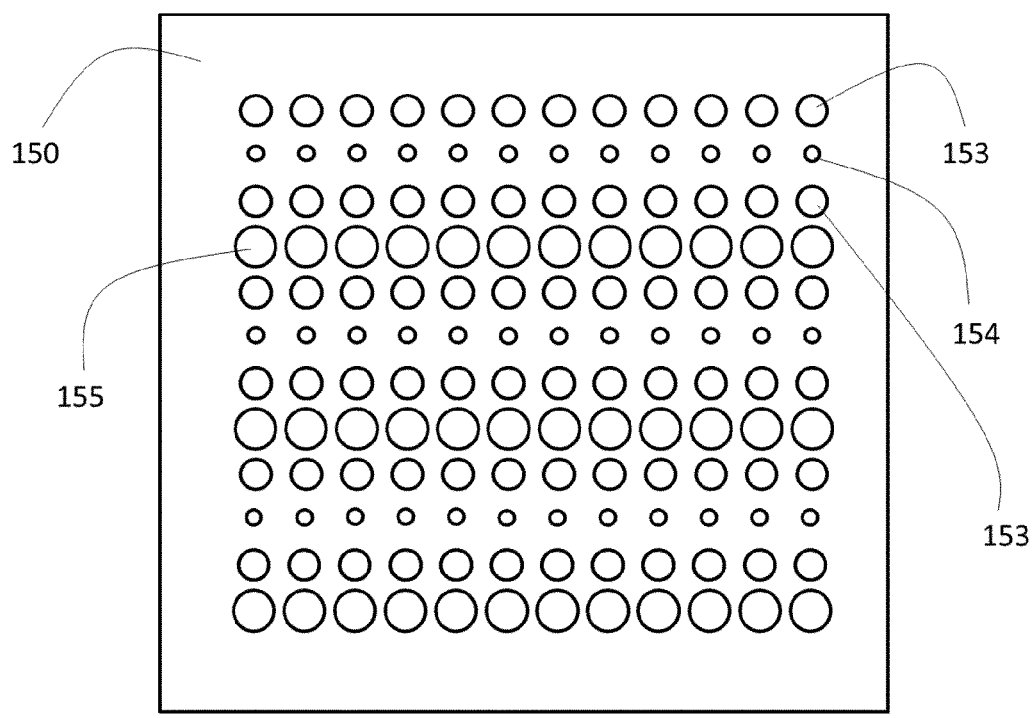

FIG. 28 illustrates a perforated sheet for which the holes are distributed in layers with three different diameters.

Figure 29:
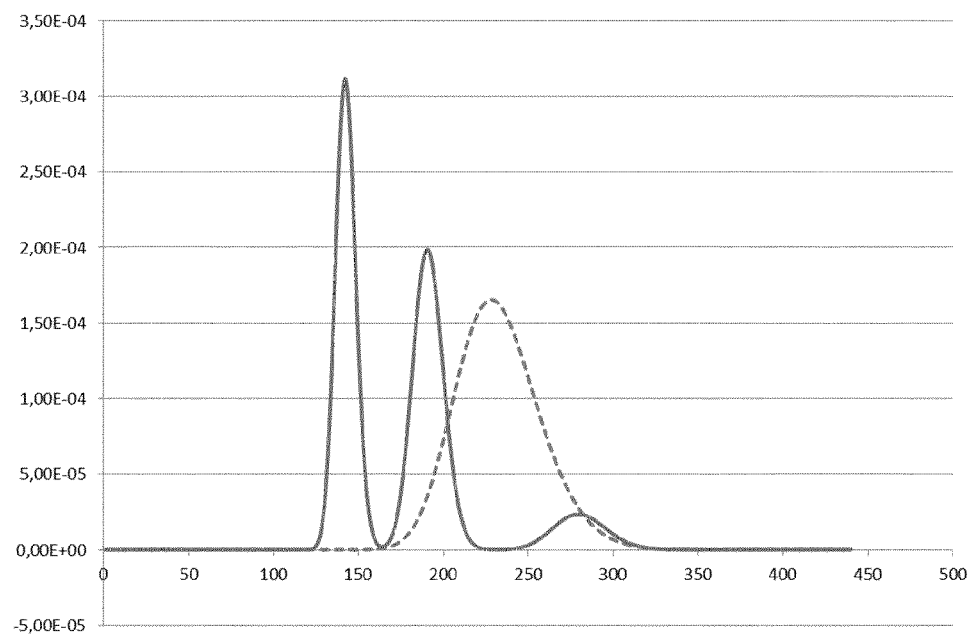
Figure 30:
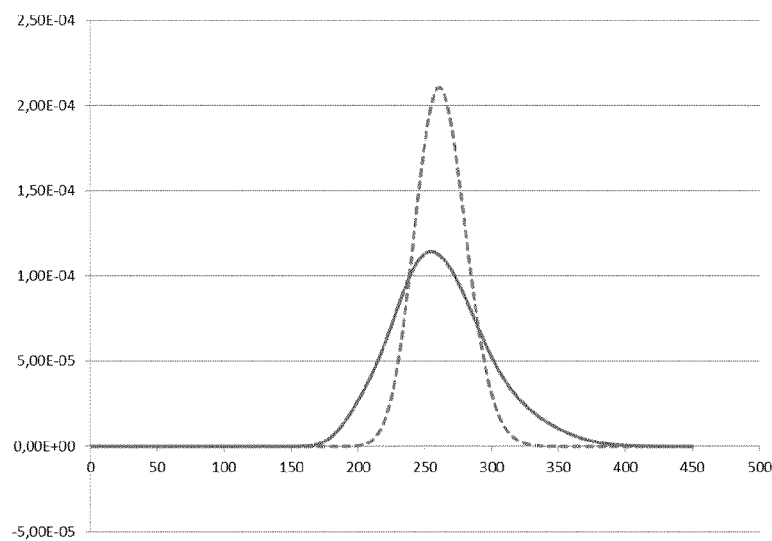

FIG. 29 illustrates the chromatographic responses of a same column in the case when the eluted molecule is of a molecular diameter less than twice the diameter of the pores allowing diffusion between the adjacent conduits (curve in dotted lines), and in the case when its molecular diameter, greater than twice the diameter of the pores, does not allow this (curves in solid lines), the column containing three families of conduits of different diameters arranged in superposed layers, FIG. 30 illustrates chromatographic responses of a same column in the case when the eluted molecule is of a molecular diameter less than twice the diameter of the pores allowing diffusion between the adjacent conduits (curve in dotted lines), and in the case when its molecular diameter, greater than twice the diameter of the pores, does not allow this (curves in solid lines), the column contains conduits for which the diameters are randomly distributed according to a Gaussian law for which the standard deviation corresponds to 5% of the average diameter of the conduits.

FIGS. 31 to 34 illustrate chromatograms obtained from a device according to the invention.

DETAILED DESCRIPTION OF THE INVENTION

The interest is focused on the optimization parameters of a separation of a given chemical compound, molecule or biomolecule, in a multicapillary packing including between the walls of the conduits a porous solid including at least one population of connected pores through which may take place the molecular diffusion of the species to be separated. These pores make a free passage for molecular diffusion between contiguous conduits.

Chromatography is a particular molecular separation method characterized in that it carries out a separation of a mixture of chemical substances under contradictory action of a dynamic driving of these species by a stream of an eluant phase of a retention of these species by a stationary phase.

Preferably, this method is continued until complete elution of the separated species out of the stationary phase.

According to the invention, the chromatographic method will be advantageously characterized by its behavior under linear conditions, i.e. for a short injection as a pulse of products to be separated. Under these conditions, the dilution of the species is large and the sharing coefficient of the species to be separated with the stationary phase does not depend on the concentration.

It is obvious that such columns may be used in preparatory methods.

According to the invention, such a chromatographic separation or such a chromatographic method will be characterized in that it comprises for an optimum of efficiency, advantageously at least 300 theoretical stages, and preferably at least 1,000 theoretical stages.

This makes it different from separations by membranes, catalytic processes and separations by adsorption or ion exchange in particular.

Advantageously according to the invention, the length of the packing will be greater than 10 mm.

Advantageously according to the invention, the volume of the micropores and of the mesopores of the material making up the walls of the packing measured by nitrogen absorption will be greater than 0.1 $cm^3/g$ and preferentially greater than 0.2 $cm^3/g$.

Advantageously according to the invention, the ratio between the volume of the conduits of the material of the packing and the volume of the packing measured by the ratio between the volume calculated from the geometrical dimensions of the conduits and the total volume of the packing is greater than 20%, preferably greater than 35%, still more preferentially greater than 50% and in a particularly advantageous way, greater than 65%.

In the field of the chromatographic method, a distinction is made between elution chromatographies and affinity chromatographies.

Advantageously, the invention sets into play an elution chromatography method.

The elution chromatography may be conducted with any known technique, such as for example discontinuous chromatography on a column, radial or axial continuous annular chromatography, the mobile bed being simulated.

The chromatography applies to liquid, gas and supercritical phases.

The present invention is a chromatography method in which a gas, liquid or supercritical mobile phase is circulated, containing species to be separated through a packing, said packing being characterized in that:

it includes a plurality of capillary conduits crossing the packing between a so-called upstream face through which the mobile phase penetrates into the packing and a so-called downstream face through which the mobile phase emerges from the packing.

the material of the walls includes a first population of connected pores, ensuring the passages from one conduit to the other allowing molecular diffusion to operate between adjacent conduits, pores having an average diameter ($d_{pore}$) greater than twice the molecular diameter of the molecules to be separated.

the diameter of the conduits is less than 50 µm.

Advantageously, the mobile phase penetrates the totality of the first population of connected pores so as to produce a monophasic mobile phase continuum between the conduits.

Advantageously, the molecular diffusion of the species to be separated between the conduits is carried out within said mobile phase continuum.

Advantageously, the so-called "relative dispersion height" ratio of the theoretical plate height ($H_{disp}$) due to the inhomogeneities of the packing over the total theoretical plate height (H) is less than 0.66.

Advantageously, the theoretical plate height ($H_{disp}$) due to the inhomogeneities of the packing is defined by the relationship $$H_{disp} = 0.778 * \frac{v_0 * (FKD * SigmaD^2 + FKE * SigmaE^2 + FKL * SigmaL^2) * (d_c + d_e)^2}{FDiff * FDil * (1 + k') * 2}$$

It will be noted that this formula comprises static terms relating the morphological structure of the packing (e.g. $d_c$, $d_e$), diffusional terms at the molecular level (for example $D_0$, $D_s$, C) to hydrodynamic terms which describe its behavior in operation towards a fluid flow (e.g. $v_o$).

It therefore describes a domain of hydrodynamic operating conditions and of operation.

It will be noted that the molecular diffusion is conventionally given by Fick's law.

This formula applies for species to be separated characterized by a molecular radius $R_h$ in the elution solvent, a molecular diffusion coefficient $D_0$ in the elution solvent, a molecular diffusion coefficient $D_s$ in or on the stationary phase, a sharing coefficient K between the stationary phase and the elution solvent, a retention factor k' in the chromatographic column, for a packing including conduits with an average size of $d_c$ separated by walls with an average thickness $d_e$ for which the irregularity is characterized by a standard deviation of the diameter $d_c$ reduced to its average SigmaD, by a standard deviation of the thickness $d_e$ reduced to its average SigmaE, and by a standard deviation of the length of the conduits reduced to its average SigmaL, a packing for which the constitutive porous material of the walls is characterized by a porous volume fraction P, a stationary phase volume fraction $f_{VolStat}$ or a specific adsorption surface area S, a tortuosity T, and including at least a population of connected pores of diameter $d_{pore}$, and for a mobile phase of viscosity µ flowing with the average velocity $v_c$ in the conduit.

Advantageously, the so-called "relative dispersion height" ratio of the theoretical plate height ($H_{disp}$) due to the inhomogeneities of the packing over the total theoretical plate height (H) is calculated at the efficiency optimum of the packing defined by the Van Deemter curve.

Advantageously, the material of the walls ensures a condensed phase continuity binding the conduits with each other.

These conduits will have a diameter adapted to chromatographic separation, less than 500 µm, preferably less than 250 µm.

However, in a very preferential way for carrying out the invention, these conduits will have a diameter of less than 50 µm, preferably less than 30 µm, and still more preferentially less than 10 µm.

Indeed, an essential differentiating factor between multicapillary packings and particulate packings towards a chromatographic method lies in the much lower pressure drop of the first.

At the optimum of efficiency, this also means that a multicapillary packing operating under a pressure drop identical with that of a particulate packing will have a number of theoretical plates 3 to 4 times greater, and a productivity (in flow rate/surface unit of its section) also 3 to 4 times greater.

These advantages become relevant when the pressure drop of the bed becomes a sensitive operating parameter requiring special tooling in order to have to be imposed.

Therefore, for a low limit for condensed phase chromatography and more advantageously in a liquid phase, the simple manometric height of the stationary phase bed itself allowing gravity flow. For a multicapillary packing, this effective limit is located between a diameter of a conduit of less than 50 µm for currently used fluids, and preferably less than 30 µm.

Indeed, chromatography is carried out simply in gravity apparatuses, where the weight of the fluid column on the packing causes its flow.

The upper limit of the diameter of the capillaries will be obtained when the flow of the fluid at the velocity allowing the optimum of the efficiency of the packing will cause a pressure drop equal to the weight of the fluid column considered over the height of the bed.

It is known that for a multicapillary packing at the efficiency optimum:

$$\frac{V_c * d_c}{D_0} = V_R$$

Poiseuille's law is written as $$\Delta P = \frac{32 * \mu * LG * v_c}{d_c^2}$$

The pressure caused by the fluid height LG is written as
$\Delta P = \rho * g * LG$ The result is that:

$$d_{max} = \sqrt[3]{\frac{32 * \mu * D_0 * V_R}{\rho * g}}$$

The table below exemplifies $d_{max}$ for different current liquids in chromatography.

| Solvent | µ (Po) | Do (m2/s) | $V_R$ | ρ (kg/m3) | dmax (µm) |
|---|---|---|---|---|---|
| Water | 0.001 | 1E−09 | 5 | 1000 | 25.3869139 |
| Hexane | 0.00031 | 3E−09 | 5 | 659 | 28.4754613 |
| Methanol | 0.00055 | 2E−09 | 5 | 791 | 28.3363475 |
| Chloroform | 0.00057 | 2E−09 | 5 | 1480 | 23.2716977 |

$V_R$ is generally comprised between 2 and 5.

$d_{max}$ is the maximum diameter of the conduits allowing natural equilibration of a gravity chromatography.

Another limit of multicapillary packings was discovered by the inventor. It was discovered that when the walls of the conduits are porous, the efficiency of the chromatographic method measured by its Number of Theoretical Plates or NTP increases linearly with the length of the column instead of being limited by the imperfections of independent conduits not communicating through diffusion.

After study it is found, and this the essential point of the present invention, that this consideration essentially applies to the species to be separated and not to the elution solvent.

According to the invention, this consideration leads to selecting for a given separation, a packing having a porosity adapted to the desired separation.

The pores of the material making up the walls of the conduits will therefore be adapted to the size of the molecules to be separated: for a separation in a condensed phase, a connected population of these pores advantageously has an average diameter greater than twice the molecular diameter of the molecules to be separated, and preferentially comprised between twice and 1000 times the molecular diameter of the molecules to be separated. These pores ensure a connected passage from one conduit to the other allowing molecular diffusion to operate between adjacent conduits.

According to the invention, these pores make up a continuum, for which the morphology and the volume fraction are such that they give the possibility of crossing the percolation threshold giving the possibility of making the material permeable to diffusion between the adjacent conduits.

Advantageously, these pores have a diameter greater than the mean free path of the molecules for an application in gas chromatography.

Advantageously, the molecules with a molecular weight comprised between 0 and 1,000 g/mole will be separated with sizes of communicating pores of the material of the walls between the conduits comprised between 4 and 30 nm, the molecules of molecular weight of 10,000 g/mole will be separated with sizes of communicating pores of the material of the walls between the conduits comprised between 10 and 100 nm, the molecules with a molecular weight of 100,000 g/mole will be separated with sizes of communicating pores of the material of the walls between the conduits comprised between 30 and 300 nm.

According to the invention, the conduits are essentially free for the circulation of a fluid.

By free for the circulation of a fluid, is meant that the pressure drop of a fluid through a conduit is less than 3 times the pressure drop in said conduit entirely empty of any solid material.

According to the invention, the conduits are advantageously empty of any solid material.

In particular in the case when the conduits would contain solid material, its porous volume will be advantageously greater than 95% by volume, advantageously greater than 98% by volume.

The inventor has discovered that the diffusivity of the molecules to be separated through the walls of a multicapillary packing would give the possibility of considerably increasing the efficiency of this packing in terms of resolving power and make this efficiency directly proportional to the length of this packing.

The efficiency of the obtained packing is however not equal to that of a single capillary, and the recorded loss of efficiency is expressed by an additional theoretical plate height which adds to the theoretical plate height of the single capillary or of a perfectly regular ideal packing.

The inventor has demonstrated that this theoretical plate height is dependent on several factors intimately related to the geometry of the conduits and of the porous solid which separates them.

Computer simulations were carried out and showed that the efficiency of a chromatographic method in a porous monolith was constant and independent of its length.

Now, it is demonstrated that the efficiency of a multicapillary packing with non-porous solid walls for which the stationary phase thickness is constant and the diameter of the capillaries is randomly variable should tend towards a maximum given by the formula:

$$N_{maxD} = \frac{1}{FKD * SigmaD^2}$$

It is also demonstrated that the efficiency of a multicapillary packing with non-porous walls for which the diameters of the capillary conduits are equal and the stationary phase thickness is randomly variable according to the conduits should tend to a maximum given by the formula:

$$N_{maxE} = \frac{1}{FKE * SigmaE^2}$$

Further it is demonstrated that the efficiency of a multicapillary packing with non-porous walls for which the diameters of the capillary conduits are equal, the stationary phase thickness is constant and for which the length of the conduits is randomly variable, should tend to a maximum given by the formula:

$$N_{maxL} = \frac{1}{FKL * SigmaL^2}$$

An analysis of the molecular diffusion phenomenon between the conduits gives the possibility of understanding the phenomenon.

It is considered that the same species injected into each conduit are each assigned a fictitious conduit number allowing them to be tracked in an independent way.

A chromatographic process in a porous multicapillary packing is subject to a diffusive remixing phenomenon between adjacent conduits.

The diffusion of a solute injected in an amount Q at instant to =0 in a central point of a diffusive homogeneous continuous medium of two dimensions satisfies a Gaussian law of the type:

$$x = \frac{Q}{(4 * \Pi * D * t)} * \exp\left(-\frac{R^2}{4 * D * t}\right)$$

The concentration x has the shape of a bell curve which spreads out and collapses over time by diffusion of the material in the infinite medium.

It is thus conceivable that the individual conduits separated by a medium open to molecular diffusion receive material from the conduits which surround them.

It may be stated that this contribution resorts to a population of surrounding conduits increasingly large over space time.

According to this analogy, the term in 2*D*t is homogeneous to an average surface covered by the diffusive spreading phenomenon after a time t.

If this surface is divided by the unit surface of an elementary cell of the packing having the average section of a conduit and of its stationary phase, i.e. the section of the packing divided by the number of conduits, a characteristic amount of the number of conduits in interactions at time t.

This number linearly increases with time.

On the other hand, it may be calculated analytically that the maximum number of theoretical plates which may produce a set of independent capillaries with solid walls of variable diameters according to a Gaussian probability law including a constant stationary phase thickness on their wall is given by the formula involving the factor defined by the name FKD in this text and in the claims:

$$N_{maxD} = \frac{1}{FKD * SigmaD^2}$$

With $$FKD = \left(\frac{2 + 3 * k' + KS * (d_e^2 / d_c^2)}{1 + k'}\right)^2$$

In the case when $d_e$ is small relatively to $d_e$ this formula is reduced to:

$$FKD = \left(\frac{2+3*k'}{1+k'}\right)^2$$

SigmaD is defined in this text and in the claims as being the relative standard deviation (standard deviation/mean) of the hydraulic diameter of the conduits.

k' is calculated as the ratio between the amount of solute or species to be separated in the stationary phase to the amount of solute in the mobile phase at equilibrium.

k' is conventionally measured by the relationship $$k' = \frac{t_R - t_0}{t_0}$$

In the case of shared chromatography $$k' = K\frac{V_s}{V_m}$$

K is the sharing coefficient of the chemical species considered between the stationary phase and the mobile phase. In the case of sharing by adsorption on a solid stationary phase, the concentration in the stationary phase may be calculated conveniently on the basis of a ratio of the component mass adsorbed on the volume of the stationary phase. This gives the possibility of retaining the definition of K.

It is also possible to calculate analytically that the maximum number of theoretical plates which may produce a set of independent capillaries with solid walls of constant diameters including a variable stationary phase thickness according to a Gaussian probability law on their wall is given by the formula involving the factor defined by the name of FKE in the text:

$$N_{maxE} = \frac{1}{FKE * SigmaE^2}$$

With $$FKE = \left(\frac{k_0 * PB}{(1+k_0)}\right)^2$$

$$k_0 = \frac{(f_{VolStat} * K + P) * d_e * (2*d_c + d_e)}{d_c^2}$$

$$PB = \frac{(2*d_c + 2*d_e)}{(2*d_c + d_e)}$$

These formulae take into account the porosity P, the thickness of the wall and of the volume fraction of stationary phase.

SigmaE is defined in this text and in the claims as being the relative standard deviation (standard deviation/mean) of the stationary phase thickness surrounding the conduit among the different conduits.

It is possible to analytically calculate that the maximum number of theoretical plates which may produce a set of independent capillaries with solid walls of variable lengths according to a Gaussian probability law including constant stationary phase thicknesses on their walls and constant diameters of capillary conduits is given by the formula involving the factor defined by the name of FKL in this text and in the claims:

$$N_{maxL} = \frac{1}{FKL * SigmaL^2}$$

It is calculated that:

$$FKL = 4$$

SigmaL is defined in this text and in the claims as being the relative standard deviation (standard deviation/mean) of the length of the conduits. It is noted that a set of capillaries with solid walls will be very poor in terms of chromatographic performances, in practice limited to a few hundred theoretical plates. The result of this is the requirement of giving the walls of the conduits a porous structure allowing molecular diffusion to occur between adjacent conduits.

It is known that if the behavior of N capillaries for which the conduits have a diameter or another randomly variable quantity following a normal law is analyzed, the obtained behavior is that of a new normal law for which the variance is the elementary variance divided by N. This is the variance of a multiple drawing of a same Gaussian random variable.

The behavior of this multiple drawing is expressed by the law:

$$N_{max} = \frac{1}{FK * Sigma^2}$$

As molecular diffusion is expressed by a number of conduits in interaction which is linearly increasing with time, N increases linearly with time, and the efficiency $N_{max}$ increases linearly with time and therefore with the length of the packing, which is consistent with a constant partial dispersion height over time.

The number N may be correlated with the Gaussian spreading by the formula:

$$N \propto \frac{2 * D_{real} * t_R}{(d_c + d_e)^2}$$

The number $d_e$ is calculated by supposing that all the volume contained in the walls of the conduits of the packing is uniformly distributed and concentrically on the periphery of the conduits. The number $d_e$ is equal to twice the thickness of this layer.

The contribution of inhomogeneity of the conduits to the efficiency, or partial theoretical plate height related to this phenomenon, therefore remains constant over time for a constant mobile phase velocity.

$$H_{dispD} = \frac{L}{N_{maxD}} = \frac{L * FKD * SigmaD^2}{N} \propto \frac{L * FKD * SigmaD^2 * (d_c + d_e)^2}{2 * D_{real} * t_R}$$

$$H_{dispE} = \frac{L}{N_{maxE}} = \frac{L * FKE * SigmaE^2}{N} \propto \frac{L * FKE * SigmaE^2 * (d_c + d_e)^2}{2 * D_{real} * t_R}$$

$$H_{dispL} = \frac{L}{N_{maxL}} = \frac{L*FKL*SigmaL^2}{N} \propto \frac{L*FKL*SigmaL^2*(d_c+d_e)^2}{2*D_{real}*t_R}$$

The efficiency of a chromatographic packing is measured by the theoretical plate height.

The latter may be written within the scope of chromatography under linear conditions, as the contribution of several terms or partial heights, comprising a term relating to a virtual packing of capillaries of strictly equal diameters and equal to the average of the conduits of the actual packing, including a uniform wall thickness equal to the average of the conduits of the actual packing, and with a same length equal to the average of the conduits of the actual packing, and an interaction term between conduits or a dispersion term related to the inhomogeneity of the latter:

$$H = H_{cap} + H_{disp}$$

$$H_{disp} = H_{dispD} + H_{dispE} + H_{dispL}$$

The theoretical plate height $H_{cap}$ of an average single capillary is easily accessible for any material, documented and its theory is known.

It may also be calculated by a computer.

The total theoretical plate height is easily measurable experimentally by means of the width at half height LMH of the chromatographic peak stemming from a commercial apparatus, according to the formula:

$$NPT = 5.54 * (t_r/LMH)^2$$

And $$H = LG/NPT$$

It will be necessary for proper operation of a multicapillary packing that the plate height related to the dispersion $H_{disp}$ term does not become very high with regards to the global efficiency term H, i.e. that it does not represent a too high fraction of the total theoretical plate height.

This is characterized by the value of the Relative Dispersion Height given by the following formula:

$$\text{Relative Dispersion Height} = \frac{H_{disp}}{H}$$

According to the invention, the operating parameters and the morphology of the packing should be such that the Relative Dispersion Height does not exceed 0.66 for the species to be separated.

Advantageously, for better efficiency of the packing, this Relative Dispersion Height will not exceed 0.5, and still more preferentially will be less than 0.3.

One will fully benefit from the characteristics of such a packing when the Relative Dispersion Height will be less than 0.1.

The dispersion height may be known according to the following formula:

$$H = H_{disp} + H_{theo}$$

Knowing H by a measurement and by calculating $H_{theo}$ as the theoretical plate height of a single capillary column having characteristics identical with an average capillary column representative of the actual packing, or if the structural details do not make this possible by calculating $H_{theo}$ as the theoretical plate height of a packing having uniform average characteristics representative of the actual packing, $H_{disp}$ is inferred therefrom as their difference.

Such a column may comprise a central conduit with a diameter equal to the average of the diameter of the conduits equal to the square root of the arithmetic mean of the square of their diameters, on its periphery thickness of a stationary phase identical with that of the actual packing and having a thickness equal to the arithmetic mean of its thickness in the packing, and having a length equal to the square root of the arithmetic mean of the square of their length.

The same quantities may be used for simulating or carrying out measurements on an ideal multicapillary packing.

In order to calculate an estimation of said averages on an actual packing, reference will be made to the indications given at the end of this text.

$H_{theo}$ may be calculated analytically, obtained by experiments or obtained by computer simulation.

In order to determine $H_{theo}$ of a multicapillary packing having an actual wall structure, it is possible to resort to a computer simulation including all the morphological, geometrical and constitutive, physical and physico-chemical details of said wall and of the packing, as well as the parameters of the fluids during flow and the thermodynamics of the species to be separated. Software packages like COMSOL multiphysics give the possibility of easily obtaining such performances.

The input data of such a simulation are essentially
- the porous fractions filled with mobile phases in the wall, the tortuosity and the average pore size and the size distribution of pores of these porous fractions as well as the molecular diffusivity of the species to be separated measured in these phases under the conditions of chromatographic separation. When the latter are not available experimentally, it is possible to estimate them with the method of Wilke and Chang.
- the porous fractions filled with organic gel or an organic liquid stationary phase in the wall, as well as the molecular diffusivity of the species to be separated measured in these gels if required under the conditions of the chromatographic separation.
- the geometry of the wall including details such as the position and the dimensions of the areas filled with the organic gel, the organic liquid and the mobile phase and optionally dead areas or filled with fluids or substrates other than the mobile phases, the organic liquid and the organic gel, as well as the molecular diffusivity of the species to be separated measured in the latter under the conditions of chromatographic separation.
- the sharing coefficients of the species to be separated among the different phases in presence in the concentration field encountered during the chromatographic process.
- the pressure drop applied to the packing and the composition of the eluant fluid as well as its viscosity under the conditions of the chromatographic separation.

At the efficiency optimum of the packing, $H_{theo}$ for a non-retained compound may be advantageously calculated in a preliminary way by the formula:

$$NTH\text{Max} = \frac{LG}{d_c + d_e * P} * 1.6$$

$$H_{theo} = LG/NTH\text{Max}$$

One infers therefrom $$\text{Relative Dispersion Height} = \frac{H_{disp}}{H} = 1 - \frac{LG}{NTH\text{Max}*H}$$

The relative dispersion p height may also be advantageously calculated by means of the following formulae.

The medium in which occurs the diffusion of the species to be separated is not a homogeneous medium. It contains free conduits in which flows a fluid, or a substantial volume containing a substantial mass, and a stagnant volume present in the pores comprising the eluant phase and the stationary phase.

If the previous Gaussian is considered, several correction factors have to be taken into account.

The diffusion coefficient of the species to be separated in the actual medium of the packing may be modeled by the following formula corresponding to a conduction in parallel in the centre of the conduits and in the walls of the packing associated in series with conduction in a thickness of the material of the walls:

$$D_{real} = Fdiff = \frac{d_c + d_e}{\frac{d_c}{DC} + \frac{d_e}{DE}}$$

With $$DC = \frac{d_c * d_c * D_0 + [(d_c + d_e) * (d_c + d_e) - d_c * d_c] * DE}{(d_c + d_e) * (d_c + d_e)}$$

And $$DE = \frac{D_0 * P * C * (P + f_{VolStat})}{T * (P + f_{VolStat} * K)} + \frac{D_s * f_{VolStat} * C * K * (P + f_{VolStat})}{T * (P + f_{VolStat} * K)}$$

The effect of the live mass and of the inertial mass is expressed by a following empirical correction coefficient defined by the term FDil in this text and in the claims.

$$FDil = \frac{d_c^2}{(d_c^2 + ((d_c + d_e)^2 - d_c^2) * (P + f_{VolStat} * K))}$$

The final formula is written as:

$$H_{disp} = \frac{ConstPropD * L * FKD * SigmaD^2 * (d_c + d_e)^2}{2 * FDiff * FDil * t_R} +$$
$$\frac{ConstPropE * L * FKE * SigmaE^2 * (d_c + d_e)^2}{2 * FDiff * FDil * t_R} +$$
$$\frac{ConstPropL * L * FKL * SigmaL^2 * (d_c + d_e)^2}{2 * FDiff * FDil * t_R}$$

It is possible to set:

ConstPropD=ConstPropE=ConstPropL=ConstProp

I.e. with:

$$DFactor = \frac{v_0 * (FKD * SigmaD^2 + FKE * SigmaE^2 + FKL * SigmaL^2) * (d_c + d_e)^2}{2 * FDiff * FDil * (1 + k')}$$

for $$v_0 = \frac{L}{t_0}$$

$$H_{disp} = ConstProp * DFactor$$

The value of the constant ConstProp is found equal to 0.778 by a computer simulation study.

All the quantities present in these formulae are well known to one skilled in the art and accessible to measurement, commonly characterized or easily inferred from the usual characterizations.

The porosity is the proportion of connected porous volume of the material making up the walls of the packing, this is a characteristic published in the technical sheets of the commercial materials.

The porosity P is measurable by porosimetry with mercury for the pores with sizes greater than 50 nm, by nitrogen adsorption for pores with sizes of less than 50 nm.

The size of the pores stems from the same techniques.

The tortuosity represents the spatial travel which a molecule has to cover in order to go from one point to another in the porous material while deviating from the straight line. This is a currently admitted and documented value.

In particular, many laws have been proposed for connecting porosity to tortuosity.

It is possible to consult "Tortuosity-porosity relation in the porous media flow", Maciej Matyka, Arzhang Khalili, Zbigniew Koza, 22/01/2008.

Without pretending to be exhaustive, the following law may be quoted, which will be the one used for the definitions of this text when a direct measurement will not be available:

$$T = 1 - p * ln(P)$$

Wherein for p a value of 0.80 may be assumed.

The factor C measures the reduction in the molecular diffusivity of the solute related to the size of the pores of the material making up the walls.

This quantity is calculated differently in a dense condensed phase (either supercritical or liquid) or in a diluted phase (gas).

In the gas phase, the diffusion becomes impeded when the diffusive flow enters a Knudsen flow. This occurs when the mean free path of the molecules becomes of the order of or greater than the diameter of the pores.

The Knudsen diffusivity is written as:

$$D_{KA} = \frac{d_{Pore}}{3} * \sqrt{\frac{8 * K * N_{av} * TK}{\Pi * M_A}}$$

When the Knudsen diffusivity and the molecular diffusivity compete with each other, the following may be written:

$$\frac{1}{D_{Ae}} = \frac{1}{D_{KA}} + \frac{1 - \alpha * y_A}{D_{AB}}$$

With $$\alpha = 1 + \frac{N_B}{N_A}$$

Generally this formula is simplified by:

$$\frac{1}{D_{Ae}} = \frac{1}{D_{KA}} + \frac{1}{D_{AB}}$$

The coefficient C is inferred therefrom $$C = \frac{D_{Ae}}{D_{AB}} = \frac{D_{KA}}{D_{AB} + D_{KA}}$$

In a condensed phase, C is calculated differently. Many correlations are available in the literature. The latter will be quoted as a definition for the formulae of the present text (Deen, 1987):

$$C = K_p * K_r$$

With $$K_p = (1-\lambda)^2$$

And $$K_r = 1 - 2.104*\lambda + 2.089*\lambda^2 - 0.948*\lambda^3$$

$$\lambda = \frac{R_h}{r_0}$$

$R_h$ is the molecular radius of the species molecule to be separated considered like a sphere and $r_o$ is the radius of the pores.

$K_p$ is a factor taking into account a deviation of the concentration at equilibrium between the pores and the infinite medium.

$K_r$ takes into account the steric impediments of the molecules to be separated in the volume of the pores.

The following table calculates the ratio C for different molecules and different pore sizes.

| Molecule | rh (nm) | $d_{pore} = 2 * r_o$ (nm) | λ | Kp | Kr | C |
|---|---|---|---|---|---|---|
| organic | 0.15 | 0.3 | 1 | 0.00 | 0.04 | 0.00 |
| organic | 0.15 | 0.6 | 0.5 | 0.25 | 0.35 | 0.09 |
| organic | 0.15 | 1 | 0.3 | 0.49 | 0.53 | 0.26 |
| organic | 0.15 | 2 | 0.15 | 0.72 | 0.73 | 0.53 |
| organic | 0.15 | 4 | 0.075 | 0.86 | 0.85 | 0.73 |
| organic | 0.15 | 6 | 0.05 | 0.90 | 0.90 | 0.81 |
| organic | 0.15 | 10 | 0.03 | 0.94 | 0.94 | 0.88 |
| protein | 1.5 | 6 | 0.5 | 0.25 | 0.35 | 0.09 |
| protein | 1.5 | 10 | 0.3 | 0.49 | 0.53 | 0.26 |
| protein | 1.5 | 30 | 0.1 | 0.81 | 0.81 | 0.66 |
| protein | 1.5 | 100 | 0.03 | 0.94 | 0.94 | 0.88 |
| macromolecule | 5 | 30 | 0.33 | 0.44 | 0.50 | 0.22 |
| macromolecule | 5 | 100 | 0.10 | 0.81 | 0.81 | 0.66 |
| macromolecule | 5 | 300 | 0.03 | 0.93 | 0.93 | 0.87 |

As seen previously, the effective diffusivity of a molecule in a porous medium is related to several factors:
1. To the volume fraction of the porous medium open to the diffusion of the molecules
2. To the tortuosity of the medium, i.e. to the length that the molecule has to effectively cover for joining two points by circumventing the obstacles formed by the walls of the pores. It is expressed as the ratio between the straight line distance and the effectively covered distance on average.
3. To the actual diffusivity of the molecules in the pores of the medium.

It is considered that the effective diffusivity is written by means of the group appearing in the formula giving FDiff: $D_{eff} = D_0 * P * C/T$. It is possible to use equally $D_{eff}/D_0$ or $P*C/T$ in said formula.

The following capacity group is used in the formula giving FDil:

$$f_{VolStat} * K$$

Both of these terms receive acceptance as specified as follows according to the type of chromatography used.

The study of the solute retention phenomenon is reduced to a stationary phase volume.

For example for a sharing chromatography, the sharing coefficient is reduced to the volume of the liquid or gel stationary phase, for a superficial attachment of a mass of solutes on the surface of a gel or of a porous solid, the sharing coefficient is reduced to the volume of the gel or of the solid while excluding the pores, for an attachment of a solute mass in pores of a gel or of a porous solid, the sharing coefficient is reduced to the volume of the gel or of the solid while excluding the pores. In the case when a swelling of a gel occurs during the absorption of a solute or of an ion, the volume taken into account is the non-solvated volume by the solute. It will be noted that the effect of the solvation by the mobile phase is itself taken into account in the useful volume of the gel.

$f_{VolStat}$ is the volume fraction of the non-solvated stationary phase by a solute and excluding its pores in the walls of the conduits and K is the sharing coefficient measured between the relevant stationary phase as said non-porous and non-solvated homogeneous volume by the solute and containing said solute, and the mobile phase, and is expressed in $(mol/m^3)/(mol/m^3)$.

The making of packings having the required characteristics will be accomplished preferably by observing the following item 7, advantageously simultaneously the items 1, 2, 3, 5, 6 and 7 and even more advantageously the totality of the following 9 items simultaneously:
1. Preferably, conduits with circular, hexagonal or square sections will be made.
2. Preferably, these conduits will be stacked at the apices of a constant triangular or square mesh.
3. The conduits will extend in a rectilinear way and without any bends along the whole length of the packing
4. The apertures of the conduits will be open and will open on each side of the packing.
5. The variability (or standard deviation) of the diameter of the conduits will be less than 15% of their average diameter, preferably less than 5% of their average diameter, and more advantageously less than 2.0% of the latter.
6. The material of the walls will have a porosity greater than 15% by volume, and advantageously greater than 40% by volume. This quantity affects both the porosity factor P and the tortuosity factor T. A packing having a high pore volume level will be less tortuous. Therefore it will be much more efficient. Preferably, packings will be used having a porosity of about 60% by volume.
7. The pores of the material will be adapted to the size of the molecules to be separated: for a separation in a condensed phase, a population of these pores advantageously has an average diameter greater than twice the molecular diameter of the molecules to be separated, and preferentially comprised between twice and 1,000 times the molecular diameter of the molecules to be separated. These pores ensure a connected passage from one conduit to the other allowing molecular diffusion to operate between adjacent conduits. Advantageously, these pores have a diameter greater than the free mean path of the molecules for an application in gas chromatography.

8. The walls will be made so as to give their thickness, their topology and their homogeneity great regularity. This means that the thickness $d_e$ will have a standard deviation better than 30% of its average value between the conduits and for a same conduit. Preferentially, this standard deviation will be better than 10% of its average value. This may be accomplished for example with a coating procedure by continuous soaking of a regular and circular wire. The fibers are then removed as described in patent application WO 2011/114017 for example.

9. Advantageously, a first connected population of addressing pores with a large diameter (macroporous or mesoporous) will be made in the walls allowing fast diffusion of the molecules within the porosity and between the conduits, and a second population of contiguous and communicating functional pores with those of the first population, which will have the task of activity of the separation and will provide a specific surface area, and capacity.

The packing according to the invention is characterized in that it preferably develops more than 300 theoretical plates at the optimum efficiency, preferably more than 1,000 theoretical plates and even more advantageously more than 10,000 theoretical plates. Indeed, the commercially available porous monoliths are intended for a use different from chromatography, generally filtration or separations via membranes, and have diameters of conduits of more than 0.5 mm and wall thicknesses of the order of 1 mm. The walls of packings stemming from sintering of ceramics at high temperatures are generally non-porous and more particularly their porosity is not percolating towards diffusion.

As a first approximation, the maximum number of optimal theoretical plates NTHMax of a porous monolith will be calculated according to the invention as being given by the relationship:

$$NTH\text{Max} = \frac{LG}{d_c + d_e * P} * 1.6$$

In order to benefit from the packings according to the invention, it will be characterized in that it develops more than 100,000 plates.

The packings according to the invention may develop more than 500,000 plates.

From among the methods which may be used for making these multicapillary packings, in particular mention will be made of the methods described in application WO 2011/114017.

Let us recall that these methods include a method for manufacturing a monolithic porous material comprising substantially rectilinear and parallel with each other capillary conduits, characterized in that it comprises the steps of:

providing a bundle of so-called precursor fibers of the conduits for which the diameter is equal to that of the capillary conduits, forming a matrix around fibers, removing the fibers so as to form said capillary conduits.

Advantageously, the packing comprises at least one portion for which:

the capillary conduits are substantially rectilinear and parallel with each other the conduits have a substantially uniform diameter relatively to each other, the section of each conduit is regular over the whole of its length, the whole of the conduits cross right through said portion.

By substantially uniform diameter is meant in the present text that the standard deviation on the diameter of the conduits does not differ from more than 15% of their average diameter, advantageously, not more than 5% and even more advantageously not more than 2% of their average diameter.

By substantially uniform section is meant that the section of a conduit does not vary by more than a factor 3 between two portions of a same conduit.

Advantageously, a porous material of the walls is selected having a first population of pores interconnected with each other and with conduits of diameter such that they allow effective diffusivity of the species to be separated in the walls of the packing at least equal to 10% of their diffusivity in a non-porous free medium.

Advantageously, these pores have an average diameter comprised between 1 and 2,000 nanometers.

In order to not to lose excessively specific surface area, one will operate advantageously in an interval of pore size depending on the application.

For a separation in a condensed phase, this population advantageously has an average diameter of pores greater than twice, preferentially greater than 5 times and even more preferentially greater than 10 times the molecular diameter of the molecules to be separated.

For a separation in a condensed phase, this population advantageously has an average diameter of pores of less than 1,000 times, more preferentially less than 100 times and even more preferentially less than 30 times the molecular diameter of the molecules to be separated.

Advantageously, the average diameter of the communicating pores of the material are greater than twice and less than 1,000 times, more preferentially greater than twice and less than 100 times and even more preferentially greater than 5 times and less than 30 times the molecular diameter of the molecules to be separated.

Molecules of organic chemistry are divided in small molecules for which the molecular diameter is of about 0.3 nanometers, in large molecules of an intermediate size like proteins, and into macromolecules of large size.

Advantageously, the molecules with a molecular weight comprised between 0 and 1,000 g/mol will be separated with communicating pore sizes of the material of the walls between the conduits comprised between 4 and 30 nm, the molecules with a molecular weight of 10,000 g/mol will be separated with communicating pore sizes of the material of the walls between the conduits comprised between 10 and 100 nm, the molecules with a molecular weight of 100,000 g/mol will be separated with communicating pore sizes of the material of the walls between the conduits comprised between 30 to 300 nm.

Advantageously, the optimum size of communicating pores (in nm) of the material of the walls between the conduits of the packing will be expressed according to the molecular weight MW (in kg/mol) of the species to be separated by the law:

$$d_{pore}=10*\sqrt{MW}$$

Advantageously, these pores have a diameter greater than the mean free path of the molecules for an application in gas chromatography.

Advantageously, this material will contain a second population of pores in open contact with the first population.

Advantageously, this second population will have a pore diameter less than that of the first population.

Advantageously, the pore volume of the first population will represent more than 40%, preferably more than 50% and even more preferentially more than 60% of the pore volume of the porous material of the packing, a pore volume calculated by excluding the volume of the conduits, i.e. by only considering the volume of the packing external to the walls of the conduits.

Advantageously, the pore volume of the second population will represent between 10% and 60% of the pore volume of the porous material of the packing.

Advantageously, bimodal monolithic silica gels will be used, the first population of which will be macroporous and the second population mesoporous.

Advantageously, this monolith is made of silica gel.

Advantageously, the first population consists of macropores, and the second population of mesopores.

Non-limiting examples of the methodologies for controlling the size of silica gel pores will be found in the following publications. These publications are cited as an illustration and by no means form an exclusive base for setting the state of the art.

"Shrinkage during drying of silica gel" of D. M. Smith et al., Journal of non crystalline solids, 188, (1995), 191-206, "Pore structure evolution in silica gel during aging/drying Part I, Temporal and thermal ageing" Pamela J. Davis, Journal of non crystalline solids, 142, (1992), 189-196, "Pore structure evolution in silica gel during aging/drying Part II, Effect of Pore fluids" Pamela J. Davis, Journal of non crystalline solids, 142, (1992), 197-207, "Pore structure evolution in silica gel during ageing/drying Part II, Effects of Surface Tension" Ravindra Deshpande, Journal of non crystalline solids, 144, (1992), 32-44.

In a particularly advantageous way, it will be perfectly possible to control the pore size of the packing according to the invention by using for its manufacturing a method with a binding load.

In such a method, a powdery load is agglomerated under the action of an organic or mineral binder.

The load may advantageously consist in a porous stationary phase for chromatography like a silica, an alumina, a cellulose, etc. . . .

The binder may consist in a sol, a sol-gel method, a clay, a ceramic, a polymer, etc. . . . .

These products are available commercially with pore sizes and porous characteristics (tortuosity, pore volume or porosity, etc. . . . ) in a wide range and perfectly defined.

At Silicycle company will in particular be found silicas with a pore size defined to be 40 Angstroms, 60 Angstroms, 80 Angstroms, 90 Angstroms, 100 Angstroms, 120 Angstroms, 150 Angstroms, 300 Angstroms, 1,000 Angstroms. These silicas for chromatography are on their online available catalogue on their internet site with morphologies (spherical, irregular) and with various grain sizes (from 1.8 to 500 μm).

These silicas may be milled and sieved in order to obtain any desired grain size between 0.2 μm and 500 μm for example.

Their shaping into a multicapillary packing may be accomplished by means of a binder, around fibers assembled as a bundle so as to form a matrix. The fibers are then removed leaving their imprint as conduits in the matrix.

Advantageously, this packing will be made with a bimodal silica gel for separations of macromolecules:

Examples which may be used will be found in the following document:

N. Ishizuka, Designing monolithic double pore silica for high speed liquid chromatography, Journal of Chromatography A, 797 (1998), 133-137.

Advantageously, this packing is made in a monolithic organic polymeric gel.

The nature of the gel and its cross-linking level will be selected in order to select the desired pore size. This pore size and the porosity are well documented in commercial literature, scientific literature and patent literature.

Among the polymeric gels, mention will in particular be made in a non-limiting way of Polystyrene Divinylbenzene polymers containing from 2 to 8% of DVB, silicas grafted with cyclodextrin, cellulose and its derivatives, in particular its esters, carbamate or amylase, polyholosides, polytriphenyl methyl methacrylate, polypyridyl-2-diphenyl methyl methacrylate, polyacrylates, polyesters, polyvinyl alcohols, cross-linked agaroses and substituted derivatives, cross-linked dextrans.

According to an embodiment, the organic gel is a copolymer of styrene and of divinylbenzene.

Copolymers of styrene and of divinyl benzene have high diffusivity and permeability towards molecules dissolved in a solvent. In order to increase this diffusivity, the styrene level is reduced. This reduction has the effect of varying the pore size of the material.

It is possible to vary the weight level of divinylbenzene in the styrene between 20%, and 2%, a strong level reducing the pore size.

In particular, these organic gels may be made starting from mixtures of monofunctional monomers and of multifunctional monomers polymerized in a pore-forming medium. The multifunctional monomers cross-link the obtained polymer.

These monomers may be acrylates, methacrylates, acrylamides, methacrylamides, vinylpyrollidones, vinylacetates, acrylic acid, methacrylic acid, vinyl sulfonic acid, etc. . . .

The monofunctional monomer level may vary between 2% and 98% by weight of the total monomers.

Advantageously, it is comprised between 2% and 40% by weight of the total monomers.

The bi- or multi-functional monomers may be monomers based on benzene, naphthalene, pyridine, alkyl ethylene, glycol, etc. including two or several vinyl functional groups.

The bi- or multi-functional monomer level may vary between 100% and 2% by weight of the total monomers.

Advantageously, said level is comprised between 98% and 60% by weight of the total monomers.

The blowing agent is any material or product which may be removed after polymerization for generating porosity. This may be an organic solvent, water, a decomposable polymer, etc. . . . . The selection of the blowing agent and its amount determines the average size and the size distribution of the obtained pores.

Advantageously, the blowing agent volume is comprised between 20% and 500% of the volume of monomers or of oligomers making up the organic gel.

Still more advantageously, the blowing agent volume is comprised between 40% and 300% of the volume of the monomers or of the oligomers making up the organic gel.

The obtained pore sizes by varying these conditions are well documented and are part of the state of the art.

In particular the following document will be consulted for the synthesis of cross-linked agaroses:

"Agar derivatives for chromatography, electrophoresis and gel-bound derivatives" Jerker Porath, J. C. Janson, T. Laas, J. Chromatogr., 60 (1971), 167-177.

The cross-linked dextrans and agaroses are known under the trade names of Sephadex and Sepharose (a brand of GE Healthcare).

The size of their pores is perfectly under control and determined by their cross-linking degree.

Figure 1:
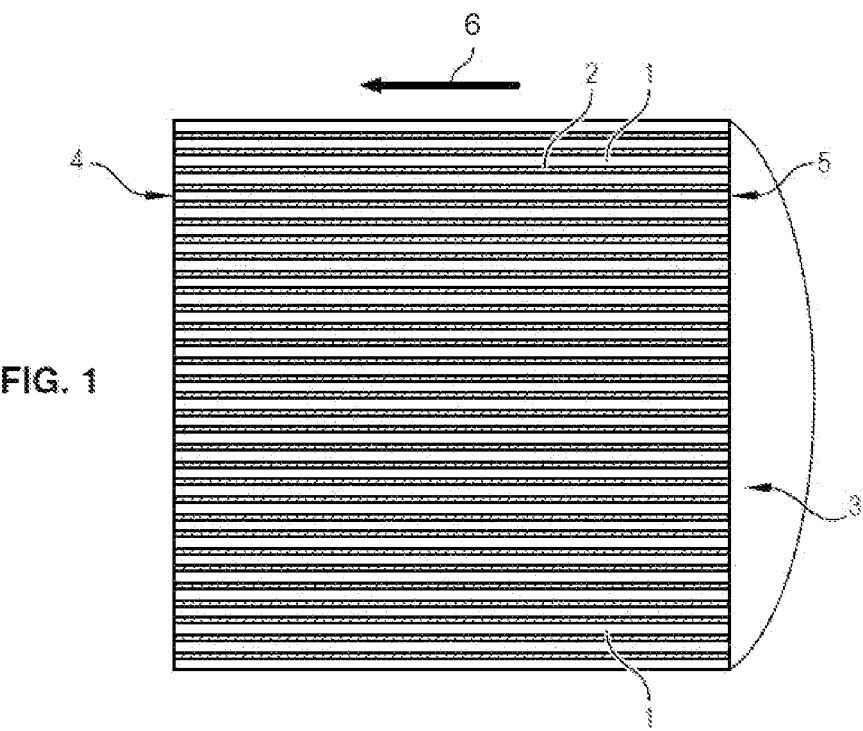
FIG. 1 is a sectional view of a main view of a cylindrical multicapillary packing along a direction parallel to its major axis.

FIG. 1 is a sectional view of a cylindrical multicapillary packing 3 along a direction perpendicular to its major axis.

It comprises a porous mass 2 and empty capillary conduits 1 wherein the fluid crossing the packing 3 may circulate freely. The porous mass is advantageously monolithic.

In the described case, the capillary conduits are straight, parallel and spaced out regularly. The different conduits have morphologies and diameters as identical as possible. Each conduit crosses the material, i.e. it advantageously has its ends open on each side 4 and 5 of the cylindrical packing, allowing circulation of the fluid from the inlet side to the outlet side.

Figure 2:
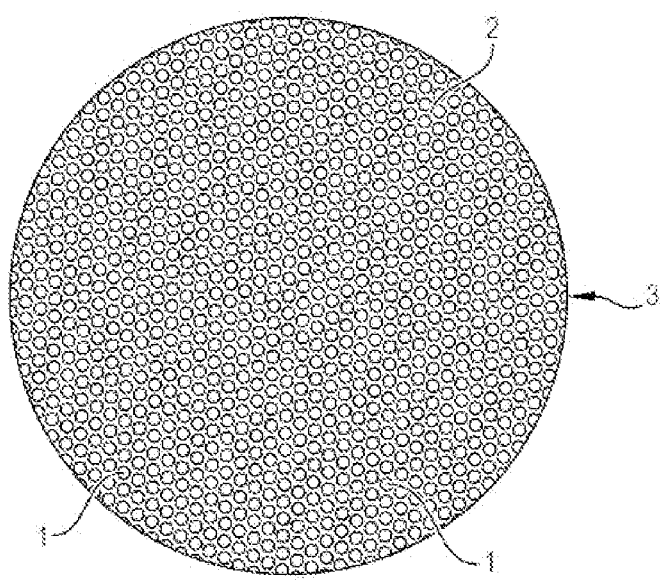
FIG. 2 is a sectional view of a main view of a cylindrical multicapillary packing along a direction perpendicular to its major axis.

FIG. 2 is a top view of one face 5 of the cylindrical packing as seen along the direction 6. The apertures of the individual capillary conduits 1 are distinguished in the mass 2.

Figure 3:
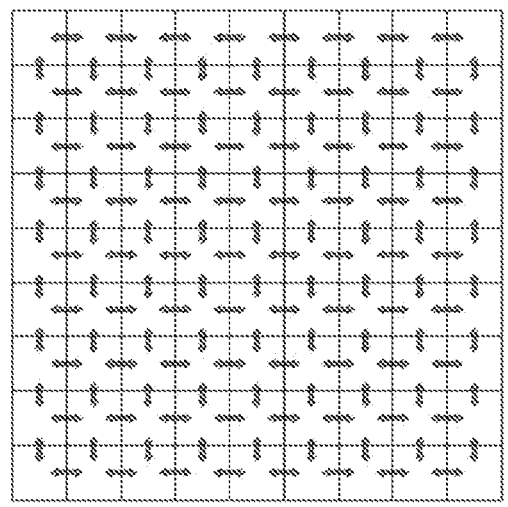
FIG. 3 shows the physical diagram used for simulating the behavior of the multicapillary packings.

FIG. 3 represents the physical scheme simulated by computer. The conduits distributed over a square or hexagonal mesh exchange material with their neighbors by molecular diffusion through their walls.

FIG. 4 represents the numerical scheme simulated on a computer. The multicapillary column is discretized in slices or cells along the flow axis of the fluid (arrow D1). Inside each slice, the section of each conduit is discretized into cells with cylindrical symmetry (arrow D2). The porous material is characterized by volume porosity or empty fraction, a stationary phase fraction, a tortuosity and a correction coefficient C of the diffusivity calculated on the basis of an average pore size. Ordinary differential equations (ODE) describe the convective, diffusional material balance and the accumulation of each eluted or eluting compound in each cell are posed and solved sequentially by an explicit digital integrator of the Euler type with a short time step.

FIG. 5 represents a first result of the simulations. The curves are plotted with the length of the column (in μm) in abscissas and the number of theoretical plates in ordinates.

The curve delimited by rhombuses which peaks at a number of theoretical plates independent of the length represents the behavior of an independent bundle of capillaries with solid walls. Said curve represents a packing consisting of conduits with a randomly variable diameter according to a Gaussian statistical law around a mean of 10 μm with a standard deviation of 0.5 μm, for non-porous walls.

The diameter of the conduits varies statistically according to a normal law. The line delimited by squares represents the behavior of the same column with porous walls allowing the molecules of the substances to be separated to diffuse between the conduits. The efficiency increases linearly and proportionally to the length. The diffusion levels the behavior differences among the conduits. This straight line represents the same bundle as the lower curve with porous walls having a 55% pore volume, a wall thickness of 2 μm and a pore size ten times greater than the molecular diameter of the species to be separated.

FIG. 6 illustrates the concentration profile resulting from the diffusion of a component present initially in a conduit after a period t. The material diffuses into the other conduits. The bell Gaussian type curve obtained spreads out and collapses over time. Consequently, the behavior of each conduit becomes an accumulated average of the contributions of an increasing number of conduits when the time elapses. The independent behavior of each conduit is leveled and permanently becomes the result of an average over a sample which is increasingly wide of neighboring conduits.

FIG. 7 shows this behavior. A central conduit diffuses in the peripheral conduits and receives material from the latter, the amount of material being all the greater since the color assigned to the conduit is darkened.

FIG. 8 illustrates the correlation obtained between the partial theoretical plate height ascribable to the dispersion phenomenon Hdisp and DFactor, both expressed in micrometers. The correlation is linear and excellent in the whole digitally explored range of operating conditions.

FIG. 9 represents the different variables for characterizing a porous material according to the invention. The material seen as a section has solid portions 6 separated by a connected network of pores 7 of diameter 10. The volume fraction of voids 7 is the porosity P. The average ratio between the effectively covered path 9 by a diffusing molecule and the optimal path 11 is the tortuosity T of the material. It is assumed in this figure that the fluid flow flows from top to bottom of the figure.

FIG. 10 schematically illustrates the ratios between the diameter of the diffusing molecules in a condensed phase and the diameter of the pores 15 extending through a porous material 12. The large size molecules 14, for which the diameter is of the order of magnitude of the diameter of the pores 15 undergo steric hindrance during their diffusion. On the other hand, the molecular diffusivity of species of small size 13 for which the diameter is one order of magnitude below that 15 of the pores is not affected significantly.

FIG. 11 illustrates the pressure drops of an aqueous solvent in two columns of the same length, one filled with a spherical particulate stationary phase (square points rotated by 45°), the other one of a multicapillary monolith (horizontal square points). The abscissas bear the diameter of the particles or of the conduits in μm, the ordinates the pressure drop in bars. The pressure drop is calculated at the optimum efficiency of the column in both cases. It is seen that the pressure drop is of one order of magnitude lower with capillary conduits. The deviation becomes significant in practice for a characteristic diameter of 30 μm.

FIG. 12 shows a Van Deemter curve obtained by simulation. This curve is obtained for a capillary of diameter 10 μm surrounded by a film of porous stationary phase with 55% of pore volume and 2 μm of thickness. The axis of the abscissas is the velocity of the mobile phase in the conduit in μm/s, the axis of the ordinates represents the theoretical plate height in μm. The Van Deemter curve shows that the height of a theoretical plate has a minimum corresponding to the optimum efficiency of the column.

FIG. 13 describes an elution chromatography method. According to this method, a continuous flow of mobile phase 28 with optionally variable composition and temperature over time crosses the chromatography column 21 filled with a stationary phase 22. A volume of the load to be separated 23 is injected into the supply flow. Under the antagonistic effect of reversible retention of the chemical species by the stationary phase and of the elution or carrying away of the species by the mobile phase, the species migrate at different velocities along the column 21 and are separated into elution bands or peaks 24, 25, 26, etc. . . . .

The separated species are isolated by fractionating the flow leaving the column so as to collect each band at the moment of its exit from the column in the elution solvent.

This fractionation may be time based in the case of a discontinuous or angular method in the case of a continuous annular device. It may consist in the separation of a head fraction and of a tail fraction for a device in a simulated mobile bed.

The chromatogram represents the concentration peaks of the species 24, 25, 26 at the column exit over time.

FIG. 14 schematically represents a simulation on a computer of the separation of two chemical species on a multicapillary packing with porous walls, for which the diameter of the communicating pores is greater than twice the molecular diameter of these species. The capillary conduits of the packing have statistical variability on their diameter. These diameters are distributed on a Gauss curve for which the standard deviation is equal to 5% of their average diameter.

These species are for example a mineral salt like sodium chloride 40 and a peptide 41 dissolved in water.

Good separation of the two elution peaks is ascertained allowing separation of both species.

FIG. 15 schematically illustrates a simulation on a computer of the separation of the same chemical species on a packing having identical dimensional characteristics but for which the diameter of the communicating pores is greater than twice the molecular diameter of the species 40 and is less than twice the molecular diameter of species 41.

It is seen that both peaks overlap and no longer allow effective and complete separation of both species. This effect is due to the fact that the porous nature of the gel allows equilibration of the concentrations between the conduits by molecular diffusion in the case of the species 40 and no longer allows it in the case of species 41. Consequently, the species 41 is subject to a significant additional spreading out due to the irregular nature of the diameters of the capillary conduits which is no longer compensated by molecular diffusion between the adjacent conduits.

Therefore, for optimizing the performances of the separation in the presence of two species (or more) having consecutive peaks, one will ensure that the size of the connected pores is greater than twice the molecular diameter of each of said species.

FIG. 16 illustrates a sectional view along a direction parallel to its major axis of an alternative packing for chromatography according to the invention wherein the conduits 61, 61' are included in a porous monolithic mass 63 and are stacked and juxtaposed. In this case, the conduits open in an ordered or random way into the material 62 permeable to the eluant. In order to view this structure, it may be considered that these conduits may have as a precursor cut, stacked and juxtaposed fibers in a directional way so as to give them an average direction parallel to the direction of flow of the fluid in the packing. The conduits are in this case anisotropic macropores, the extent, the direction and the morphology of which promotes axial flow of the eluant phase in the packing, and included in the latter. Advantageously according to the invention, the conduits are with homogeneous lengths and diameters, and as parallel as possible.

FIGS. 17 to 24 illustrate views of the construction of a multicapillary chromatography column.

FIGS. 17-18 and 19-20 respectively illustrate elements making up the body of the column, i.e. a lower block 90 and an upper block 91. A housing or channel of a rectangular section 93 is dug in the lower block 90. This housing receives and molds the monolith. Advantageously, the synthesis of the monolith is accomplished therein. FIG. 17 is a side view of the part 90, FIG. 18 is a view thereof along its section. L represents the length of the part. The part is provided with tapped perforations allowing its assembling.

FIG. 19 is a view of the upper block 91 along its section, FIG. 20 is a side view thereof. The part 91 includes a male portion 94 intended to be fitted into the channel 93.

FIG. 21 illustrates a sectional view of the fitted-in parts 90 and 91. Their fitting-in makes a free channel 95 in which is housed the monolith.

Figure 22:
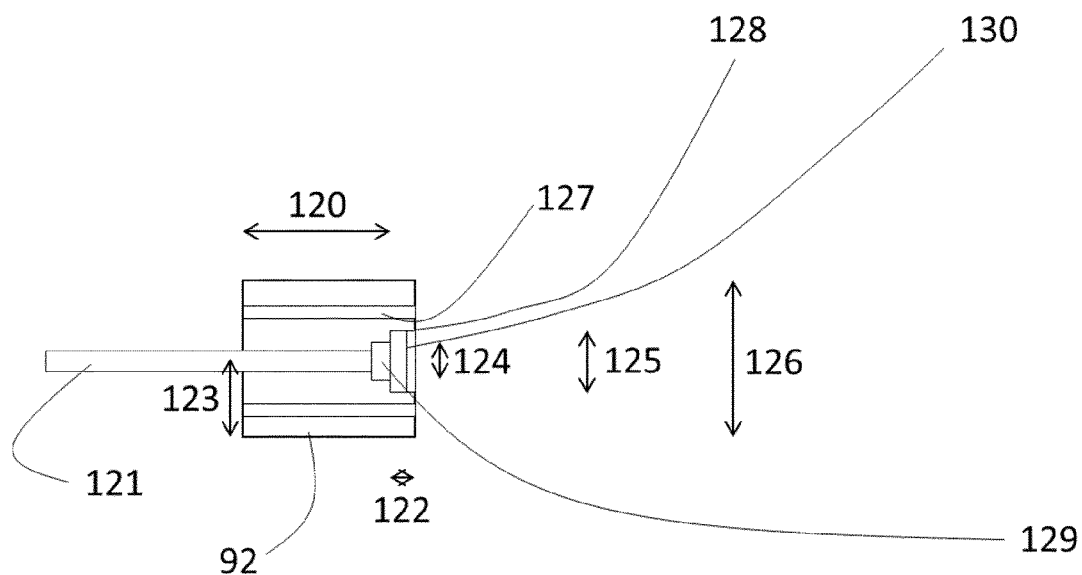
Figure 23:
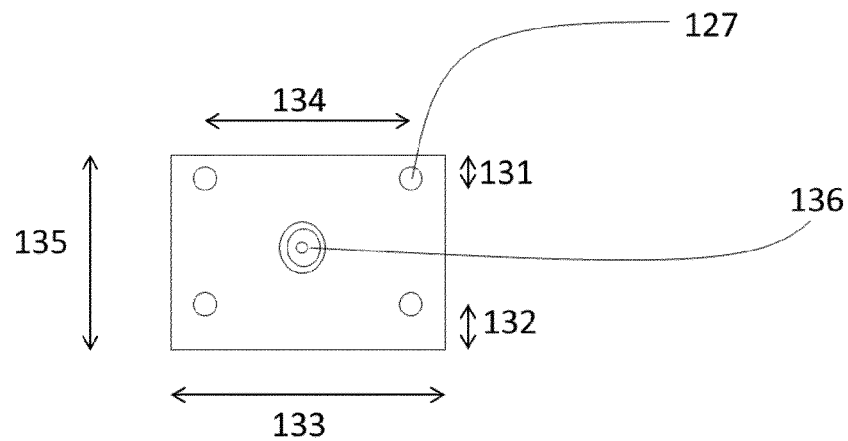

FIGS. 22 and 23 respectively illustrate in a profile view and in a front view the end piece 92 of the column allowing it to be connected to the fluidics. The part 92 includes a sealingly welded or adhesively bound tube 121 giving the possibility of bringing or discharging the mobile phase as far as the sintered filter 130 via an annular space 129. The filter is housed in an annular space 128. The perforations 127 give the possibility of assembling the column.

Figure 24:
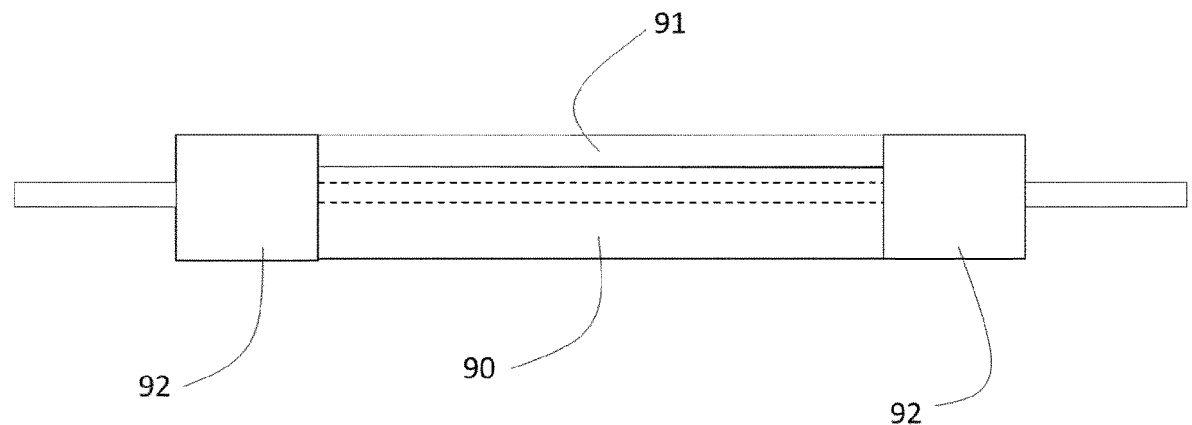

FIG. 24 schematically illustrates the geometry of the final assembly of elements 90, 91 and 92. The seal of the assembly may be simply achieved by covering a two-component adhesive with a film.

The table below explains, in an example, the dimensions represented in FIGS. 17-24.

| Reference | Dimension (mm) | Comment |
|---|---|---|
| 100 | 10 | |
| 101 | 15 | |
| 102 | 100 | |
| 103 | M3 | Threading 3 mm depth 7 mm |
| 104 | 7 | |
| 105 | 10 | |
| 106 | 4 | |
| 107 | 2 | |
| 108 | 4 | |
| 109 | 6 | |
| 110 | 12 | |
| 111 | 3 mm | Perforation (diameter) |
| 112 | M3 | Threading 3 mm depth 7 mm |
| 114 | 1.98 | |
| 115 | 2.0 | |
| 116 | 2.0 | |
| 117 | 20 | |
| 118 | 4 | |
| 120 | 20 | |
| 121 | 1.58 | 1/16 inch tube external diameter, inner diameter 0.25 mm |
| 122 | 1.25 | |
| 124 | 2.1 | diameter |
| 125 | 3.2 | diameter |
| 126 | 14 | |
| 127 | 3 | Perforation (diameter) |
| 129 | 0.3 | Depth |
| 130 | 1.0 | Thickness of the sintered filter |
| 131 | 2 | |
| 132 | 4 | |
| 133 | 20 | |
| 134 | 12 | |
| 135 | 14 | |
| 136 | 0.25 | Centered channel |

FIGS. 25 and 26 represent a method for assembling precursor wires 152 of the conduits of a monolith. A sheet 150 is perforated with regular holes 151. Very thin drill holes of the order of a few tens of micrometers may be achieved by laser drilling into stainless steel sheet, brass or polymer sheet. The wire 152 is passed between the perforations of two symmetrical opposite plates 150 spaced apart by the length L so as to achieve a bundle of parallel wires. The wires may be subsequently welded or adhesively bonded to the sheet 150 with a drop of adhesive.

FIG. 27 schematically illustrates the assembly of the bundle of wires 152 in the part 90. The bundle of wires 152 limited by the sheets 150 is inserted under a slight tension at the bottom of the groove 93. The sheets 150 achieve a temporary seal at both ends. The bundle may be filled with stationary phase and subsequently pyrolyzed, dissolved, melted or removed by any suitable means.

FIG. 28 represents a perforated sheet 150 for which the holes are distributed in layers with three different diameters 153, 154, 155. It is thereby possible to obtain bundles for which wires with three different diameters are positioned in alternating webs.

FIGS. 29 and 30 illustrate chromatographic responses from a same column in the cases when the eluted molecule is of a molecular diameter less than half the diameter of the pores allowing diffusion between the adjacent conduits (curve in dotted lines), and in the case when its molecular diameter greater than half of the diameter of the pores does not allow this (curves in solid lines). The axis of the abscissas is time, the axis of the ordinates is the response of the detector.

In the case of FIG. 29, the column contains three families of conduits of different diameters arranged in superposed layers. An example of such an arrangement is illustrated as a section in FIG. 28.

It is seen that when diffusion occurs, a single peak (curve in dotted lines) results from the interaction of the three families of conduits. When diffusion is prevented, three peaks (curves in solid lines) occur for a same compound, making reading of the chromatogram impossible.

In the case of FIG. 30, the column contains conduits for which the diameters are randomly distributed according to a Gaussian law, the standard deviation of which corresponds to 5% of the average diameter of the conduits.

It is seen that when the diffusion occurs (curve in dotted lines) the number of theoretical plates of the column is 178. When diffusion is prevented (curves in solid lines), the number of theoretical plates of the column is only 50, which shows that the column is considerably less performing.

In the present text, the molecular diameter will be calculated according to two ways according to the molecular weight and to the characteristics of the relevant substance.

For substances having a gas phase or for which the coordinates of the critical point may be calculated, the co-volume will be used, a term b of the equation of Van der Waals, divided by 4 and by the Avogadro number, and the diameter of a sphere of equivalent volume will be calculated. Indeed it is known that the co-volume b is equal to four times the molecular volume. The co-volume is easily accessible from the critical coordinates of the relevant body.

For macromolecules, biological molecules (proteins, etc. . . . ) and molecules not having any gas phase, the hydrodynamic diameter measured by dynamic diffusion of light will be used.

In the present text, the average diameter and the standard deviation of the diameter of the conduits like the average hydraulic diameter and its standard deviation measured by image analysis on one or several slices of the packing perpendicularly to the conduits.

When the individual conduits have a variability or standard deviation on their diameter along the packing, the average diameter is measured as the average hydraulic diameter of a multiplicity of slices carried out along the packing so as to obtain a statistically significant sampling with regard to the measured variability, in order to determine the volume and the wet peripheral surface area of each conduit and determining of the latter its average hydraulic diameter as four times their ratio. In the present text, the average thickness and the standard deviation of the thickness of the walls of the conduits are calculated by image analysis obtained by scanning electron microscopy on a slice of the packing perpendicular to the conduits.

When the conduits have a variability or standard deviation on the wall thickness along the packing, the average wall thickness is measured on a multiplicity of slices carried out along the packing so as to obtain a statistically significant sampling with regard to the measured variability, in order to determine the volume of each wall and its wet peripheral surface and determining on the latter its average thickness on the basis of a constant thickness surrounding the wet peripheral surface of the conduits, obtained as the ratio of the wall volume over the wet peripheral surface area.

In the present text, the average length and the standard deviation of the average length of the conduits are computed by image analysis obtained by scanning electron microscopy on one or several slices of the packing parallel to the conduits so as to obtain a statistically significant sampling with regard to the measured variability.

When the conduits have a variability or standard deviation over the length of the conduits along the packing, or when the conduits have a direction which is not perfectly aligned with the axis of the packing, the lengths are measured over a multiplicity of slices made in the packing parallel to its length so as to obtain a statistically significant sampling with regard to the measured variability, in order to determine the average length of the conduits and its standard deviation.

By statistically significant sample is meant a sample representing more than 100 independent conduits.

The packing volume outside the volumes of the conduits is easily calculated by subtracting from the geometrical volume of the packing, the average volume of the thereby determined conduits.

The molecular diffusion coefficient in a liquid medium will be measured by the method of the porous diaphragm calibrated with KCl for solutions with a concentration above 0.001M, and by the method of the open capillary for solutions with lower concentrations and biological molecules (Measurement of the diffusion coefficients, Pierre Turq, Jean-Pierre Simonin, Techniques de l'ingénieur, ref. p1515, as of 10.01.1990), paragraphs 3,211 and 3,212.

The molecular diffusion coefficient in a gas phase is measured by means of the assembly of Boardman and Wild (Diffusion of pairs of gases with molecules of equal mass, Proc. Roy. Soc. London A. 162 1937 p 511).

For gels and porous media, the method described in the following document: (Measurement of diffusion coefficients, Pierre Turq, Jean-Pierre Simonin Techniques de l'ingénieur, ref p1515, as of 10.01.1990), eq. 49 and 50 paragraph 4, 13 will preferably be used.

The effective diffusion in a porous complex medium or a gel may alternatively be measured by the porous diaphragm method calibrated with KCl, the diaphragm consisting of the material to be tested. The retained value is the worst of the experimental values.

In the present text, by average of a set of values of a variable X, is meant its arithmetic mean E[X]. The standard deviation is defined as the square root of the arithmetic mean of $(X-E[X])^2$. By distribution, is meant in the present text a set of values of the variable X.

Exemplary Embodiment 1

A nylon 6-6 thread is produced with a diameter of 0.043 mm.

This thread is positioned on a frame with rectilinear needles with a length of 220 mm.

200 g of Silica Gel for pore size chromatography of 4 nm (SiliCycle ref R10030 A) are milled down to an average diameter of particles of about 3 µm.

The powder is gradually suspended in 500 ml of a mixture of 200 ml of silica sol HS30 from Grace with 30% of dry material and 300 ml of demineralized water.

Once the suspension is completed, the nylon needles are soaked and covered with this suspension and are then dried on their frame under a dry air stream at 80° C.

The needles are then cut with an exact length of 200 mm and positioned in a square housing with a side of 2.0 mm and a length of 200 mm dug into a sheet of 20×10×200 mm of stainless steel 316L, and of a flat lid in a sheet of 20×10×200 mm of PTFE (Teflon brand registered by DuPont de. Nemours). The needles are positioned parallel to each other and regularly in successive layers forming a square section in the lower stainless steel housing so as to fill it with needles.

A mixture of 5 ml of Ludox HS30 (Grace brand, amorphous sol of silica particles with a diameter of 7 nm, with a specific surface area of 360 m$^2$/g, 30% by weight of silica being contained) and of 0.1 ml of acetic acid is prepared.

The bundle of nylon needles in its stainless steel housing is impregnated with this mixture. The liquid should fill the whole of the packing, which has to be immersed therein.

Both portions, stainless steel and teflon are screwed against each other.

The mixture is maintained at 90° C. until complete gelling of the sol.

The upper PTFE lid maintaining the bundle is extracted from the gel, the ends of the gel are cleared, and the bundle in its stainless steel housing are gradually brought with a rise in temperature of 5° C./min up to 95° C. in an oven. They are maintained and dried for 5 hours at this temperature.

The dry bundle in its stainless steel housing are gradually brought with a rise in temperature of 1° C./min up to 550° C. in an atmospheric oven. They are maintained for 5 hours at this temperature.

A lid manufactured in a sheet of 20×10×200 mm of stainless steel 316L is replaced for closing the packing as a substitution of the half shell in PTFE.

The monolith is washed with deionized water percolated through the free conduits.

The thereby obtained monolith may be directly used for liquid chromatography of molecules with a molecular weight from 100 g/mol to 200 g/mol.

Exemplary Embodiment 2

A nylon 6-6 thread is produced with a diameter of 0.043 mm.

This thread is positioned in rectilinear needles with a length of 220 mm. 200 g of Silica Gel for chromatography with a pore size of 30 nm (SiliCycle ref S10070 M) are milled down to an average particle diameter of about 3 µm.

A silica sol with a particle size of 40 nm and with 50% of dry material is obtained by adding deionized sodium silicate (by passing over a cation exchanger), so as to achieve at pH 9 and at 90° C. a regular silica deposit on a sol TM 50 from Grace in a diluted solution.

The powder is gradually suspended in 500 ml of a mixture of 200 ml of silica sol with 50% of dry material and a particle size of 40 nm obtained earlier and with 300 ml of demineralized water.

Once the suspension is completed, the nylon needles are soaked and covered with this suspension and then dried under a dry air stream at 80° C.

The needles are then cut with an exact length of 200 mm (see FIGS. 25 A and B) by clearing each side and positioned in a square housing with a side of 2.0 mm and a length of 200 mm dug in a sheet of 20×10×200 mm of stainless steel 316L, and with a flat lid in a sheet of 20×10×200 mm of PTFE (Teflon brand registered by DuPont de Nemours). The needles are positioned parallel to each other and regularly by forming a square section in the lower stainless steel housing so as to fill it with needles.

A mixture of 5 ml of the 40 nm sol with 50% of dry material and with 0.1 ml of acetic acid is prepared.

The bundle of nylon needles in the stainless steel housing is impregnated with this mixture. The liquid should fill the whole of the packing, which should be immersed therein.

Both portions, stainless steel and PTFE are screwed against each other.

The mixture is maintained at 90° C. until complete gelling of the sol.

The upper PTFE lid maintaining the bundle is extracted from the gel, the ends of the gel are cleared, and the bundle in its stainless steel housing are gradually brought with a rise in temperature of 5° C./min up to 95° C. in an oven. They are maintained and dried for 5 hours at this temperature.

The dry bundle in its stainless steel housing are gradually brought with a rise in temperature of 1° C./min up to 550° C. in an atmospheric oven. They are maintained for 5 hours at this temperature.

A lid manufactured in a sheet of 20×10×200 mm of stainless steel 316L is replaced for closing the packing as a substitution for the half shell in PTFE.

The monolith is washed with deionized water percolated through the free conduits.

The thereby obtained monolith may be directly used for liquid chromatography of molecules with a molecular weight of about 1,000 g/mol.

Exemplary Embodiment 3

A mixture is prepared containing 8 g of hydroxyethyl methacrylate, 32 g of divinylbenzene, 445 mg of azobisisobutyronitrile, 120 g of dodecanol and is degassed under nitrogen for 20 minutes.

This mixture is brought to 70° C. for 24 hours. The mixture polymerizes.

The thereby achieved monolith A is washed by percolating THF for 30 minutes and dried in the oven at 90° C.

The monolith A is milled under liquid nitrogen until is obtained a grain diameter of 25 µm.

The porosity of these grains is filled with a paraffinic wax melting at 80° C. by adding under hot conditions melted wax into the stirred powder.

A thread of polydioxanone is produced with a diameter of 0.05 mm.

The thread is covered by soaking and adhesive bonding by means of an aqueous polyvinyl alcohol solution deposited beforehand with a thin layer of grains of the milled monolith B to 25 µm. It is then cut into lengths of 120 mm and assembled into a bundle with a diameter of about 4 mm in a glass tube with a length of 75 mm, and with an external diameter of 6.35 mm and an inner diameter of 4 mm prepared beforehand.

In parallel a mixture is prepared containing 8 g of hydroxyethyl methacrylate, 32 g of divinylbenzene, 890 mg of azobisisobutyronitrile, 120 g of dodecanol and is degassed under nitrogen for 20 minutes.

The bundle prepared previously is filled with this mixture and brought to 70° C. for 24 hours. The mixture polymerizes.

The thereby made composite is released by sectioning the thread segments on either side of the glass tube just underneath its ends, perpendicularly to said segments.

The thereby produced monolith is washed with a current of n-octane at 120° C. for 30 minutes, and then with THF (tetrahydrofurane) at room temperature for 30 minutes.

The polydioxanone threads are dissolved with soda N at 90° C. percolated through the packing for 1 hour, and then the packing is washed with distilled water under neutrality and dried at 105° C. The monolith is brought into an oven under an intensive vacuum at 125° C., until melting and volatilization of the wax residues and of the lightweight organics.

The thereby obtained monolith may be used directly for liquid chromatography of molecules with molecular weights from 500 g/mol to 5,000 g/mol.

Exemplary Embodiment 4

A monolith is produced according to the procedure described in Example 3.

A litre of agarose beads are dissolved in a litre of demineralized water at 95° C.

The porosity of the monolith is impregnated with this solution by soaking and draining at 95° C. of the core of the conduits and then cooled.

The occluded and gelled agarose is washed with distilled water.

A litre of solution of NaOH 1 N containing 20 ml of epichlorohydrin and 5 g of NaBH4 is prepared. The conduits of the monolith are filled therewith.

The monolith is brought to 60° C. for one hour.

The obtained cross-linked gel is washed with hot water until neutrality.

The thereby obtained monolith may be used as a basis for liquid chromatography of proteins.

Exemplary Embodiment 5

A thread of polymethyl methacrylate is produced with a diameter of 0.3 mm.

This thread is positioned on a frame.

The threads are covered by soaking with a thin film of Araldite (registered trademark) gradually deposited via a solvent route in methanol.

Silica grains for chromatography Supelco, a spherical phase with a grain size comprised between 40 and 75 µm, are adhesively bonded on threads tensioned by simply putting them into contact with the Araldite film. The assembly is polymerized for 24 h at 40° C.

The needles are then cut into a bundle with a length of 120 mm by clearing each side and positioned in a square housing with a side of 2.0 mm and a length of 100 mm dug into a sheet of 20×10×100 mm of stainless steel 316L. In parallel a flat lid is made in a sheet of 20×10×100 mm of PTFE (registered trademark Teflon of DuPont de Nemours). The needles are positioned parallel to each other in the lower stainless steel housing so as to fill it with needles.

A mixture of 5 ml of sol Ludox TM50 (Grace brand) of 20 nm with 50% of dry material and with the sufficient amount of glacial acetic acid for adjusting its pH to 7 is prepared.

The bundle of nylon needles in the stainless steel housing is impregnated with this mixture. The liquid should fill the totality of the packing, which has to be immersed therein.

Both portions, stainless steel and Teflon are screwed against each other.

The mixture is maintained at 90° C. until complete gelling of the sol.

The upper PTFE lid maintaining the bundle is extracted from the gel, the ends of the gel are cleared, and the bundle in its stainless steel housing are gradually brought with a rise in temperature of 5° C./min up to 95° C. in an oven. They are maintained and dried for 5 hours at this temperature.

The dry bundle in its stainless steel housing are gradually brought with a rise in temperature of 1° C./min up to 500° C. in an atmospheric oven. They are maintained for 5 hours at this temperature.

A lid manufactured in a sheet of 20×10×100 mm of stainless steel 316L is replaced for closing the packing as a substitution for the half shell in PTFE.

The end pieces (FIGS. 22, 23) are attached (FIG. 24) on the column and the assembly is sealed with a two-component epoxy adhesive film. The column is connected to the chromatograph.

FIG. 36 illustrates a chromatogram produced with this monolith. The conditions are the following:

Chromatograph Agilent 1100, detector with a diode array
Isocratic Mode
Solvent: Water
Room T°
Flow rate: 0.005 ml/s
Detection wavelength: 210 nm The separated species are polyacrylic acid (1) and acetic acid (2).

The axis of the abscissas represents the elapse time in mins after the injection, the axis of the ordinates the response of the detector.

Exemplary Embodiment 6

A nylon 6-6 thread is produced with a diameter of 0.050 mm.

This thread is positioned on a frame. 200 g of Silica Gel for chromatography with a pore size of 6 nm (SiliCycle) is milled down to an average particle diameter of about 3 µm.

The powder is then gradually suspended in 500 ml of a mixture of 200 ml of silica sol TM50 from Grace with 50% of dry material and 20 nm of particle size and with 300 ml of demineralized water.

Once the suspension is completed, the nylon needles are soaked and covered with this suspension and are dried under a dry air stream at 80° C.

The needles are then cut into a bundle of length 100 mm while clearing each side and positioned in a square housing with a side of 2.0 mm and a length of 75 mm dug into a sheet of 20×10×75 mm of stainless steel 316L, and with a flat lid in a sheet of 20×10×75 mm of PTFE (Teflon brand registered by DuPont de Nemours). The needles are positioned parallel with each other in the lower stainless steel housing so as to fill it with needles.

A mixture of 5 ml of the 20 nm sol with 50% of dry material and of the sufficient amount of glacial acetic acid for adjusting its pH to 7 is prepared.

The bundle of nylon needles in the stainless steel housing is impregnated with this mixture. The liquid should fill the whole of the packing, which has to be found immersed therein.

Both portions, stainless steel and Teflon, are screwed against each other.

The mixture is maintained at 90° C. until complete gelling of the sol.

The upper PTFE lid maintaining the bundle is extracted from the gel, the ends of the gel are cleared, and the bundle in its stainless steel housing are gradually brought with a rise in temperature of 5° C./min up to 95° C. in an oven. They are maintained and dried for 5 hours at this temperature.

The dry bundle in its stainless steel housing are gradually brought with a rise in temperature of 1° C./min up to 550° C. in an atmospheric oven. They are maintained for 5 hours at this temperature.

A lid manufactured in a sheet of 20×10×75 mm of stainless steel 316L is replaced for closing the packing as a substitution for the half shell in PTFE.

The monolith is washed with deionized water percolated through the free conduits and dried at 105° C. for two hours.

The end pieces (FIGS. 22, 23) are attached (FIG. 24) on the column and the assembly is sealed by a two-component epoxy adhesive film. The column is connected to the chromatograph.

The siliceous monolith is functionalized with octadecyltrimethoxysilane (Aldrich, 90%). For the grafting, a solution of 50 mL of absolute ethanol containing an excess of 5 molecules of grafts per $nm^2$ of silicic surface is used. This corresponds to have re-circulate a solution of 50 mL of ethanol containing 0.093 g (0.25 mmol) of octadecyltrimethoxysilane. The monolith is activated at 150° C. in vacuo for 4 h before the grafting in a Schlenk tube. Next the monolith is put to percolate through the solution containing the grafts by means of an HPLC pump with recirculation for 14 h with a flow rate of 0.25 mL $min^{-1}$ and a temperature of 70° C. The monolith is then washed continuously with a flow rate of 0.25 mL $min^{-1}$ with ethanol (50 mL), an ethanol/water mixture (50 mL/50 mL) and of acetone (50 mL). The monolith is dried at 80° C. for 2 days.

Figure 31:
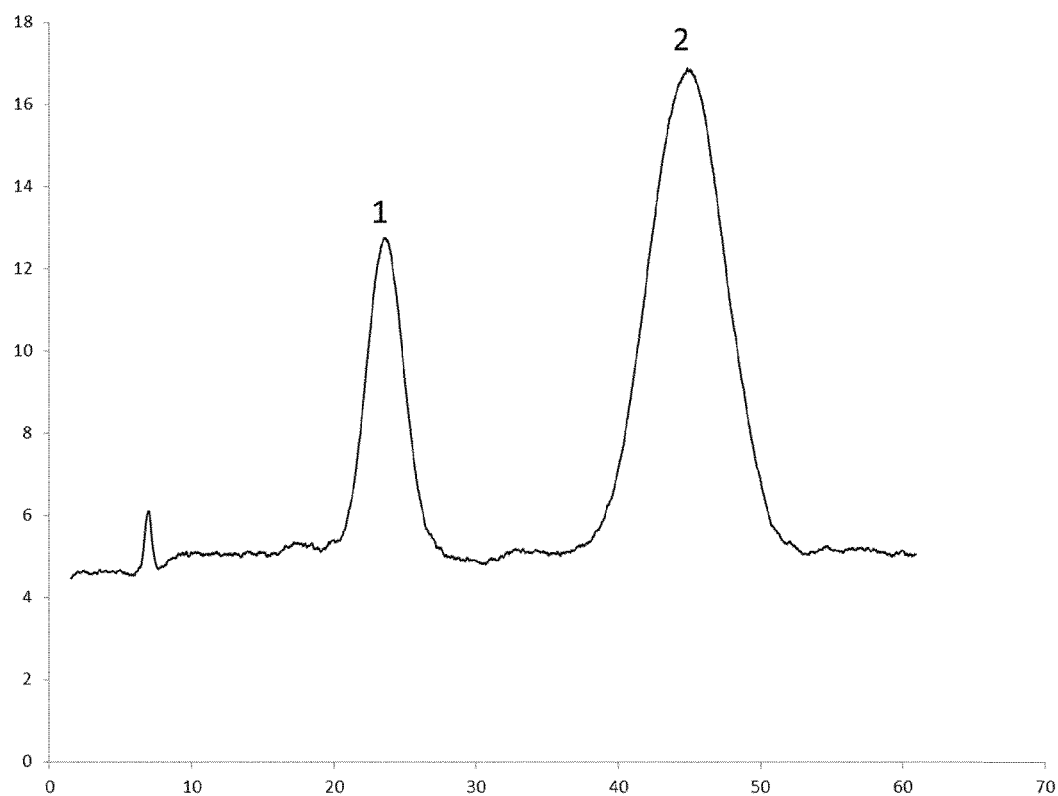

FIG. 31 illustrates a chromatogram made with this monolith.

The conditions are the following:
Chromatograph Agilent 1100, detector with a diode array
Isocratic mode
Water/Acetonitrile/$H_3PO_4$ solvent: 600/400/2
Room T°
Flow rate: 0.01 ml/min
Detection wavelength: 235 nm The separated species are acetylisalicylic acid (2) and salicylic acid (3).

Exemplary Embodiment 7

A monolith is prepared according to the procedure described in Example 3 by substituting ethylstyrene for hydroxyethyl methacrylate.

Figure 32:
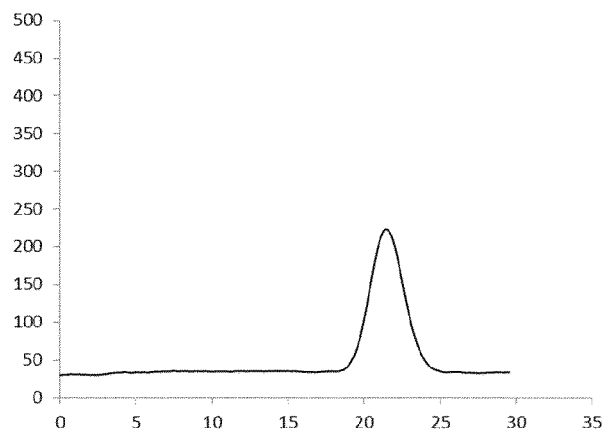

FIG. 32 illustrates a chromatogram made with this monolith.

The conditions are the following:
Chromatograph Agilent 1100, UV detector with variable wavelength Solvent A (water/acetonitrile 95/5(v/v)+0.1% of trifluoroacetic acid)
Solvent B (water/acetonitrile 5/95(v/v)+0.1% of trifluoroacetic acid)
Gradient Mode 1-65% of B in 60 min
Room T°
Flow rate: 0.012 ml/min
Detection wavelength: 235 nm The separated species are angiotensin II (1) and lysozyme (2).

The axis of the abscissas represents the elapse time in min from the injection, the axis of the ordinates represents the response of the detector.

Exemplary Embodiment 8

A preform of the channels of the monolith is made by making a bundle consisting of three families of nylon 66 threads of respectively 50, 60 and 70 μm in diameter.

The bundle is made in a square bundle of 12 threads with sides distributed along a square mesh with a pitch of 120 μm, by means of a supporting device of the type of the one shown in FIG. 30.

The threads of the three families are positioned in an alternating way in successive layers of 12 threads with the same diameter according to the sequence 50/60/70/60/50/60/70/6050/60/70/60.

The bundle is made with a length of 75 mm.

The bundle of needles is then inserted into a square housing with a side of 1.5 mm and a length of 75 mm dug into a sheet of 20×10×75 mm of stainless steel 316L, and with a flat lid in a sheet of 20×10×75 mm of PTFE (Teflon brand registered by DuPont de Nemours).

200 g of Silica Gel for chromatography with a 6 nm pore size (SiliCycle) is milled down to an average particle diameter of about 3 μm.

The powder is gradually suspended in 500 ml of a mixture of 200 ml of silica sol TM50 from Grace with 50% of dry material and a particle size of 20 nm and with 300 ml of demineralized water.

The bundle of nylon needles in the stainless steel housing is impregnated with this mixture. The liquid should fill the whole of the bundle, which should be found immersed therein.

Both portions, stainless steel and Teflon, are screwed against each other.

The mixture is maintained at 90° C. under a humid saturated atmosphere until complete gelling of the sol.

The upper PTFE lid maintaining the bundle is extracted from the gel, the ends of the gel are cleared, and the bundle in its stainless steel housing is gradually brought with a rise in temperature of 5° C./min up to 95° C. in an oven. They are maintained for 5 hours at this temperature.

The dry bundle in its stainless steel housing is gradually brought with a rise in temperature of 1° C./min up to 550° C. in an oven with an air atmosphere. It is maintained for 5 hours at this temperature.

A lid manufactured in a sheet of 20×10×75 mm of stainless steel 316L is replaced for closing the packing as a substitution for the PTFE half shell.

The monolith is washed with deionized water percolated through the free conduits and dried at 105° C. for two hours.

The end pieces (FIGS. 22, 23) are attached (FIG. 24) on the column and the whole is sealed by a two-component epoxy adhesive film. The column is connected to the chromatograph.

A characterization of the silicic material of this monolith by adsorption with nitrogen shows a median diameter of the mesopores of 8 nm and a porous volume fraction of 55%.

Figure 33:
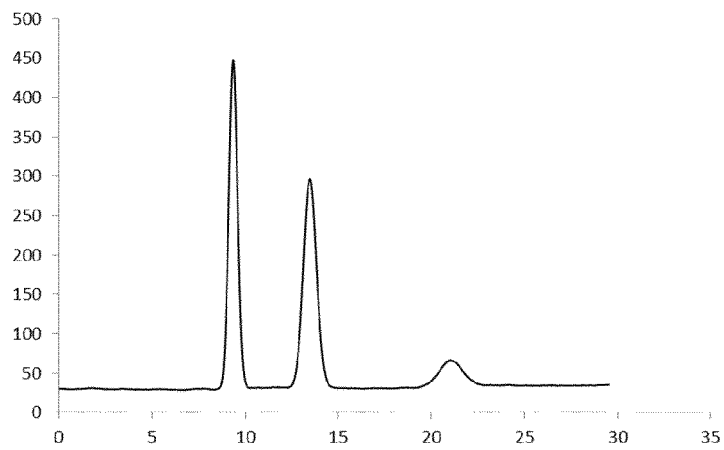
Figure 34:
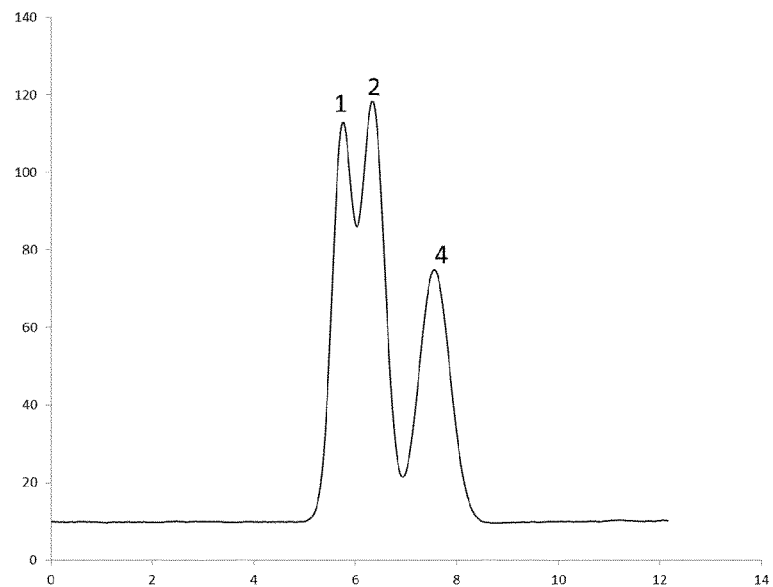

FIGS. 33 and 34 show the chromatograms obtained by means of this monolith.

The conditions are the following:
Chromatograph Agilent 1100, detector with a diode array
Isocratic mode
Solvent: Water 100%
Room T°
Flow rate: 0.01 ml/min
Detection wavelength: 235 nm FIG. 33: acetic acid tracer diluted to 0.1 N
FIG. 34: a platter with polystyrene latex microspheres (Applied Physics AP3100A) with a diameter of 100 nm, a solution with 1,000 ppm of dry material.

It is noted that the diffusion of the acetic acid between the channels allows a chromatographic response as a unique peak. On the contrary, the diameter of the polystyrene particles prevents the diffusive phenomena from occurring and each family of channels produces its own elution peak. It is no longer possible in this latter case of associating each peak with a single species.

The axis of the abscissas represents the elapse time in min from the injection, the axis of the ordinates represents the response of the detector.

Exemplary Embodiment 9

A preform of the channels of the monolith is made by making a bundle consisting of polydioxanone threads with a diameter of 50 μm.

The bundle is made in a square bundle of 10 threads with sides distributed along a square mesh with a pitch of 100 μm, by means of a supporting device of the type of the one shown in FIGS. 27 to 29. The perforated screen is made by laser drilling of 55 μm perforations in a stainless steel sheet with a thickness of 150 μm.

The bundle is made with a length of 75 mm.

The bundle of needles is then inserted into the bottom of a housing with a width of 1.0 mm, with a depth of 2 mm and with a length of 75 mm dug in a sheet of 20×10×75 mm of stainless steel 316L (FIGS. 17 and 18). A flat lid in a sheet of 20×10×75 mm of stainless steel (FIGS. 19 and 20) is prepared.

In an Erlenmeyer with an eroded neck of 25 ml, 7 g of polyethylene glycol having a molecular weight of 200 g, 0.37 g of 2,2,2-tri-(2,3-epoxypropyl)-isocyanurate and 1.6 g of bis(4-aminocyclohexyl)methane are mixed with stirring until dissolution on a heating magnetic stirrer.

After which, the mixture is injected into the housing of the previous base in stainless steel including the bundle of threads of 50 μm and the lid is laid so as to define the channel of the monolith. The whole is brought to 80° C. for 20 h in order to be polymerized.

The resulting bar is washed with water and with methanol, and then set to percolate with soda N at 90° C. for 24 h until dissolution of the threads.

After washing with water until neutrality, the packing is dried in the oven in vacuo.

The end pieces (FIGS. 22, 23) are attached (FIG. 24) on the column and the whole is sealed with a two-component epoxy adhesive film. The column is connected to the chromatograph.

FIG. 35 represents a chromatogram made with this monolith.

The conditions are the following:
Solvent: Water/acetonitrile 60/40 (100 ml/100 ml)+20 mM of phosphate buffer at pH7
Room T°
Flow rate: 0.01 ml/min
Detection wavelength: 210 nm The separated species are uracil (1), benzene (2) and hexylbenzene (3).

The axis of the abscissas represents the elapse time in min from the injection, the axis of the ordinates represents the response of the detector.

Exemplary Embodiment 10

A preform of the channels of the monolith is made by making a bundle consisting of nylon threads with a diameter of 43 μm.

The bundle is made in a square bundle with 10 side threads distributed along a square mesh with a pitch of 100 μm, by means of the supporting device of the type of the one shown in FIGS. 27 to 29. The perforated screen is made by laser drilling of perforations of 50 μm in a stainless steel sheet with a thickness of 150 μm.

The bundle is made with a length of 75 mm.

The bundle of needles is then inserted into the bottom of a housing with a width of 1.0 mm, with a depth of 2 mm and with a length of 75 mm dug in a sheet of 20×10×75 mm of stainless steel 316L (FIGS. 17 and 18). A flat lid in a sheet of 20×10×75 mm of PTFE (FIGS. 19 and 20) is prepared.

A silicic monolith is synthesized from tetraethoxysilane (TEOS, Aldrich 99%), from polyethylene oxide (PEO, molar mass=10,000, Aldrich 99%), from nitric acid (68%, Aldrich) and from $NH_4OH$ (analytical purity, Aldrich).

An Erlenmeyer of 250 mL is placed in an ice bath at 0° C. with a magnetized bar. Next demineralized water (46.30 g, 2.57 mol) and nitric acid (68% $HNO_3$, 4.60 g, 49.63 mmol) are added and stirred at 500 rpm for 15 min. Next, the PEO (4.79 g PEO including 0.11 mol of EO unit) is added and the mixture is stirred for one hour at 700 rpm so that the whole of the PEO is dissolved. The TEOS (37.70 g, 0.18 mol) is then added and the mixture is stirred for one hour. The obtained transparent solution is then poured by means of a 10 mL pipette into the inside of the bundle of threads obtained earlier kept beforehand in a dry environment at 0° C. before the filling. The bar is then placed in an oven under an atmosphere saturated with water vapor at 40° C. for 72 hours. The PTFE lid is removed.

The bar is immersed in a 2 L beaker with 1,500 mL of demineralized water at room temperature for 1 h. The monolith is then washed in the same way for four times by immersion in demineralized water (500 mL, 1 h) until a neutral pH is obtained. The monolith is then subject to a basic treatment. It is then immersed in 400 mL of an ammonia solution (0.1 M) in a polypropylene flask (500 mL). The flask is then put into an oven at 40° C. for 24 hours.

The recovered monolith is rinsed by means of a wash bottle with distilled water, dried at room temperature for 48 h and at 40° C. for 24 h on a flat surface. It is calcined at 550° C. in air for 8 hours (ramp 1° C. $min^{-1}$).

A flat lid in a sheet of 20×10×75 mm of stainless steel (FIGS. 19 and 20) is prepared.

The lid is repositioned with a PEEK gasket at 340° C. and cooled.

The end pieces (FIGS. 22, 23) are attached (FIG. 24) on the column and the whole is sealed with a two-component epoxy adhesive film.

Glossary

C: correction coefficient of the diffusivity in a free medium related to the size of the pores and to the diameter of the molecules to be separated.

$D_{real}$: molecular diffusivity or molecular diffusion coefficient of a species to be separated in the real medium of the packing m2/s $D_0$: molecular diffusivity or molecular diffusion coefficient in a free medium in the mobile phase of a species to be separated m2/s $D_s$: molecular diffusivity or molecular diffusion coefficient in a free medium in the stationary phase of a species to be separated m2/s $D_{KA}$: molecular diffusivity or molecular diffusion coefficient of Knudsen, m²/s $D_{AB}$: molecular diffusivity or molecular diffusion coefficient, m²/s $D_{Ae}$: molecular diffusivity or molecular diffusion coefficient under intermediate conditions m²/s $D_{eff}$: effective diffusion coefficient in a gel or a porous solid, m²/s $d_c$: average diameter of the conduits, meters $d_e$: average thickness of the wall separating the conduits, meters $d_{pore}$: diameter of the pores, m $d_{max}$: maximum diameter of the conduits allowing natural equilibration of a gravity chromatography, m $f_{volstat}$: volume fraction of stationary phase in the wall of the capillary conduits of the packing (m³/m³)

g: gravitational constant, equal to 9.81 m³·kg⁻¹·s⁻²

H: global theoretical plate height, meters $H_{cap}$: theoretical plate height of a single capillary of an average diameter, meters $H_{dispD}$: chromatographic theoretical plate height related to the irregularities of the diameter of the different conduits, meters $H_{dispE}$: chromatographic theoretical plate height related to the irregularities of the thickness of the walls among the different conduits, meters $H_{dispL}$: chromatographic theoretical plate height related to the irregularities in the length of the different conduits, meters $H_{disp}$: theoretical plate height related to the irregularities of the capillary conduits, meters $H_{theo}$: theoretical plate height of a perfectly regular multicapillary packing k': retention factor of the column (elution time=minimum retention time *(1+k'))

KS: sharing coefficient of the species to be separated measured between the volume of the walls and the volume of the capillaries, (mole/wall m³)/(mole/conduits m³)

K: sharing coefficient of the species to be separated between the stationary phase and the eluant phase, (mol/m³)/(mol/m³)

$K_{ads}$: sharing coefficient in adsorption of the species to be separated, (mol/m²)/(mol/m³)

L: distance covered by the eluted peak in the chromatograph during the period t, meters LG: packing length, meters LMH: mid-height width of a chromatographic peak, second NTP: number of theoretical plates of the column.

$M_A$: molar mass of the component A, kg/mol

M: molecular mass of the component to be separated, kg/mol

MW: molecular mass, kg/mol $N_{maxD}$: maximum number of plates of a chromatographic separation related to irregular diameter conduits $N_{maxE}$: maximum number of plates of a chromatographic separation related to conduits with irregular walls $N_{maxL}$: maximum number of plates of a chromatographic separation related to conduits with irregular lengths N: equivalent number of interacting conduits $N_{av}$: Avogadro number P: porosity of the porous material making up the walls of the packing, volume fraction Q: amount of material injected into the capillary, moles R: distance of the diffusive point, meters $R_h$: molecular radius of the molecules of the species to be separated, nanometers $r_0$: radius of the pores, nanometers SigmaD: relative standard deviation (standard deviation/mean) of the hydraulic diameter of the conduits.

SigmaE: relative standard deviation (standard deviation/mean) of the thickness of the walls.

SigmaL: relative standard deviation (standard deviation/mean) of the length of the conduits.

S: specific surface area of the porous material, m²/m³ t: elapse time from the injection, seconds $t_0$: retention time of a non-retained compound, seconds $t_R$: retention time of a retained compound R, seconds T: tortuosity TK: absolute temperature, Kelvins $v_0$: elution velocity of a non-retained compound, m/s $v_c$: velocity of the mobile phase in the conduit, m/s $V_R$: reduced velocity, with no dimensions $V_{molEl}$: molar volume of the eluting phase, m³/mol $V_{MolStat}$: molar volume of the stationary phase, m³/mol Vs: volume of the stationary phase in the column (m³)

Vm: volume of the mobile phase in the column (m³)

x: molar fraction

K: Boltzmann constant, MKSA

μ: viscosity of the mobile phase (Pa·s)

ρ: density of the mobile phase, kg/m³

REFERENCES

WO 2011/114017,

K Nakanishi, Phase separation in silica sol-gel system containing polyacrylic acid, Journal of non crystalline Solids 139 (1992), 1-13 and 14-24, K. Nakanishi, Phase separation in Gelling Silica-Organic Polymer Solution: Systems Containing Poly(sodium styrenesulfonate), J. Am. Ceram. Soc. 74 (10) 2518-2530-30 (1991), Deen, W. M. Hindered transport of large molecules in liquid-filled pores, A.I.Ch.E Journal, 33,1409-1425, Tortuosity-porosity relation in the porous media flow, Maciej Matyka, Arzhang Khalili, Zbigniew Koza, 22/01/2008, Shrinkage during drying of silica gel, D. M. smith et al, Journal of non crystalline solids, 188, (1995), 191-206, Pore structure evolution in silica gel during aging/drying Part I, Temporal and thermal ageing, Pamela J. Davis, Journal of non crystalline solids, 142, (1992), 189-196, Pore structure evolution in silica gel during aging/drying Part II, Effect of Pore fluids, Pamela J. Davis, Journal of non crystalline solids, 142, (1992), 197-207, Pore structure evolution in silica gel during ageing/drying Part II, Effects of Surface Tension, Ravindra Deshpande, Journal of non crystalline solids, 144, (1992), 32-44, N. Ishizuka, Designing monolithic double pore silica for high speed liquid chromatography, Journal of Chromatography A, 797 (1998), 133-137, Agar derivatives for chromatography, electrophoresis and gel-bound derivatives, Jerker Porath, J. C. Janson, T. Laas, J. Chromatogr., 60 (1971), 167-177, Boardman and Wild, Diffusion of pairs of gases with molecules of equal mass, Proc. Roy. Soc. London A. 162 1937 p 511, Measurement of the diffusion coefficients, Pierre Turq, Jean-Pierre Simonin Techniques de l'ingénieur, ref p1515, as of 10.01.1990, Thesis of Alexander SACHSE, Synthèses de microréacteurs à base de monolithes siliciques et zéolithiques à porosité hiérarchique pour le développement de la catalyse en flux, (syntheses of microreactors based on silicic and zeolithic monoliths with hierarchical porosity for development of flow catalyses), Defence held on Oct. 26, 2011, Ecole Nationale Supérieure de Chimie de Montpellier.

The invention claimed is:

1. A chromatography method in which a gaseous mobile phase is circulated, containing species to be separated through a packing comprising a stationary phase, wherein the packing includes a plurality of capillary conduits extending in the packing between an upstream face through which the mobile phase penetrates into the packing and a downstream face through which the mobile phase emerges from the packing, the material of the walls of said conduits includes a network of connected pores, said pores forming passages from one conduit to the other allowing molecular diffusion to be operated between adjacent conduits, said pores having an average diameter greater than a mean free path of the molecules of the species to be separated, the average diameter of the conduits is less than 50 μm, wherein:

the method comprises computing a relative dispersion height ratio of a theoretical plate height of the packing due to inhomogeneities of the packing over a total theoretical plate height of the packing and adjusting at least one operative parameter of the chromatography or at least one morphologic feature of the packing so that said relative dispersion height ratio is less than 0.66, the species to be separated have a molecular radius $R_h$ in the elution solvent, a molecular diffusivity Do in the elution solvent, a molecular diffusivity $D_s$ in or on the stationary phase, a sharing coefficient K between the stationary phase and the elution solvent, a retention factor k' in the chromatographic column defined by the formula:

$$k' = \frac{t_R - t_0}{t_0},$$

wherein to is a retention time of a non-retained compound and $t_R$ is a retention time of a retained compound, and the packing includes conduits of an average diameter $d_c$ separated with walls of an average thickness $d_e$ for which the irregularity is defined by a standard deviation of the diameter $d_c$ reduced to its average SigmaD, by a standard deviation of the thickness $d_e$ reduced to its average SigmaE, and by a standard deviation of the length of the conduits reduced to its average SigmaL, the constitutive porous material of the walls has a porous volume fraction P, a volume fraction of stationary phase $f_{VolStat}$ or a specific adsorption surface area S, a tortuosity T=1−0.8*ln(P), and the network of connected pores has a diameter $d_{pore}$, the mobile phase flows with an average velocity $v_c$ in the conduits and the method comprises computing the theoretical plate height ($H_{disp}$) due to the inhomogeneities of the packing based on the relationship:

$$H_{disp} = 0.778 * \frac{v_0 * \left(FKD * SigmaD^2 + FKE * SigmaE^2 + FKL * SigmaL^2\right) * (d_c + d_e)^2}{FDiff * FDil * (1 + k') * 2}$$

wherein $v_0$ is the elution velocity of a non-retained compound by the stationary phase $$FKD = \left(\frac{2 + 3*k'}{1 + k'}\right)^2$$

$$FKE = \left(\frac{k_0 * PB}{(1 + k_0)}\right)^2$$

$$FKL = 4$$

$$k_0 = \frac{(f_{VolStat} * K + P) * d_e * (2 * d_c + d_e)}{d_c^2}$$

$$PB = \frac{(2 * d_c + 2 * d_e)}{(2 * d_c + d_e)}$$

$$Fdiff = \frac{d_c + d_e}{\frac{d_c}{DC} + \frac{d_e}{DE}}$$

$$DC = \frac{d_c * d_c * D_0 + [(d_c + d_e) * (d_c + d_e) - d_c * d_c] * DE}{(d_c + d_e) * (d_c + d_e)}$$

$$DE = \frac{D_0 * P * C * (P + f_{VolStat})}{T * (P + f_{VolStat} * K)} + \frac{D_s * f_{VolStat} * C * K * (P + f_{VolStat})}{T * (P + f_{VolStat} * K)}$$

$$FDil = \frac{d_c^2}{(d_c^2 + ((d_c + d_e)^2 - d_c^2) * (P + f_{VolStat} * K))}$$

C is a correction coefficient of the diffusivity in a free medium related to the size of the pores and to the diameter of the molecules to be separated.

2. The method according to claim 1, wherein the relative dispersion height ratio is calculated at an efficiency optimum of the packing given by the Van Deemter curve.

3. The method according to claim 1, wherein the conduits have an average diameter of less than 30 μm.

4. The method according to claim 1, wherein the packing comprises at least one portion for which:

the capillary conduits are substantially rectilinear and parallel with each other, the conduits have a substantially uniform section relatively to each other, the section of each conduit is regular over the whole of its length, the set of conduits cross right through said portion.

5. The method according to claim 1, wherein the relative dispersion height ratio is less than 0.3.

6. The method according to claim 1, wherein said network of pores of the packing has an average diameter greater than 5 times the molecular diameter of at least one species to be separated.

7. The method according to claim 3, wherein the conduits have an average diameter of less than 10 μm.

8. The method according to claim 5, wherein the relative dispersion height ratio is less than 0.1.

9. The method according to claim 6, wherein said network of pores of the packing has an average diameter greater than 10 times the molecular diameter of at least one species to be separated.

10. The method according to claim 1, wherein the network of pores has an average diameter of pores greater than 10 nanometers.

11. The method according to claim 1, wherein the network of pores has an average diameter of pores greater than 100 nanometers.

12. A chromatography method comprising:
selecting a mobile phase containing at least one species to be separated;
selecting a packing comprising a stationary phase, wherein
the packing includes a plurality of capillary conduits extending in the packing between an upstream face through which the mobile phase penetrates into the packing and a downstream face through which the mobile phase emerges from the packing,
the material of the walls of said conduits includes a network of connected pores, said pores forming passages from one conduit to the other allowing molecular diffusion to be operated between adjacent conduits, said pores having an average diameter greater than twice the molecular diameter of the at least one species to be separated, and
the average diameter of the conduits is less than 50 μm; and
circulating the mobile phase in gas or liquid state through the selected packing,
wherein:
the method comprises computing a relative dispersion height ratio of a theoretical plate height of the packing due to inhomogeneities of the packing over a total theoretical plate height of the packing and adjusting at least one operative parameter of the chromatography or at least one morphologic feature of the packing so that that said relative dispersion height ratio is less than 0.66,
the species to be separated have a molecular radius $R_h$ in the elution solvent, a molecular diffusivity $D_0$ in the elution solvent, a molecular diffusivity $D_s$ in or on the stationary phase, a sharing coefficient K between the stationary phase and the elution solvent, a retention factor k' in the chromatographic column defined by the formula:

$$k' = \frac{t_R - t_0}{t_0},$$

wherein to is a retention time of a non-retained compound and $t_R$ is a retention time of a retained compound, and
the packing includes conduits of an average diameter $d_c$ separated with walls of an average thickness $d_e$ for which the irregularity is defined by a standard deviation of the diameter $d_c$ reduced to its average SigmaD, by a standard deviation of the thickness $d_e$ reduced to its average SigmaE and by a standard deviation of the length of the conduits reduced to its average SigmaL,
the constitutive porous material of the walls has a porous volume fraction P, a volume fraction of stationary phase $f_{VolStat}$ or a specific adsorption surface area S, a tortuosity T=1−0.8*ln(P), and the network of connected pores has a diameter $d_{pore}$,
the mobile phase flows with an average velocity $v_c$ in the conduits and
the method comprises computing the theoretical plate height ($H_{disp}$) due to the inhomogeneities of the packing based on the relationship:

$$H_{disp} = 0.778 * \frac{v_0 * (FKD * SigmaD^2 + FKE * SigmaE^2 + FKL * SigmaL^2) * (d_c + d_e)^2}{FDiff * FDil * (1 + k') * 2}$$

wherein
$v_0$ is the elution velocity of a non-retained compound by the stationary phase $$FKD = \left(\frac{2 + 3*k'}{1 + k'}\right)^2$$

$$FKE = \left(\frac{k_0 * PB}{(1 + k_0)}\right)^2$$

$$FKL = 4$$

$$k_0 = \frac{(f_{VolStat} * K + P) * d_e * (2 * d_c + d_e)}{d_c^2}$$

$$PB = \frac{(2 * d_c + 2 * d_e)}{(2 * d_c + d_e)}$$

$$Fdiff = \frac{d_c + d_e}{\frac{d_c}{DC} + \frac{d_e}{DE}}$$

$$DC = \frac{d_c * d_c * D_0 + [(d_c + d_e) * (d_c + d_e) - d_c * d_c] * DE}{(d_c + d_e) * (d_c + d_e)}$$

$$DE = \frac{D_0 * P * C * (P + f_{VolStat})}{T * (P + f_{VolStat} * K)} + \frac{D_s * f_{VolStat} * C * K * (P + f_{VolStat})}{T * (P + f_{VolStat} * K)}$$

$$FDil = \frac{d_c^2}{(d_c^2 + ((d_c + d_e)^2 - d_c^2) * (P + f_{VolStat} * K))}$$

C is a correction coefficient of the diffusivity in a free medium related to the size of the pores and to the diameter of the molecules to be separated.

13. A chromatography method in which a liquid mobile phase is circulated, containing species to be separated through a packing comprising a stationary phase, wherein
the packing includes a plurality of capillary conduits extending in the packing between an upstream face through which the mobile phase penetrates into the packing and a downstream face through which the mobile phase emerges from the packing,
the material of the walls of said conduits includes a network of connected pores, said pores forming passages from one conduit to the other allowing molecular diffusion to be operated between adjacent conduits, said pores having an average diameter twice the molecular diameter of at least one species to be separated, said average diameter being:

(i) comprised between 4 and 30 nm for molecules of the species to be separated having a molecular weight comprised between 0 and 1,000 g/mole,
(ii) comprised between 10 and 100 nm for molecules of the species to be separated having a molecular weight of 10,000 g/mole, or
(iii) comprised between 30 and 300 nm for molecules of the species to be separated having a molecular weight of 100,000 g/mole, the average diameter of the conduits is less than 50 µm, wherein:

the method comprises computing a relative dispersion height ratio of a theoretical plate height of the packing due to inhomogeneities of the packing over a total theoretical plate height of the packing and adjusting at least one operative parameter of the chromatography or at least one morphologic feature of the packing so that said relative dispersion height ratio is less than 0.66, the species to be separated have a molecular radius $R_h$ in the elution solvent, a molecular diffusivity $D_0$ in the elution solvent, a molecular diffusivity $D_s$ in or on the stationary phase, a sharing coefficient K between the stationary phase and the elution solvent, a retention factor k' in the chromatographic column defined by the formula:

$$k' = \frac{t_R - t_0}{t_0},$$

wherein to is a retention time of a non-retained compound and $t_R$ is a retention time of a retained compound, and the packing includes conduits of an average diameter $d_c$ separated with walls of an average thickness $d_e$ for which the irregularity is defined by a standard deviation of the diameter $d_c$ reduced to its average SigmaD, by a standard deviation of the thickness $d_e$ reduced to its average SigmaE and by a standard deviation of the length of the conduits reduced to its average SigmaL, the constitutive porous material of the walls has a porous volume fraction P, a volume fraction of stationary phase $f_{VolStat}$ or a specific adsorption surface area S, a tortuosity $T = 1 - 0.8 * \ln(P)$, and the network of connected pores has a diameter $d_{pore}$, the mobile phase flows with an average velocity $v_c$ in the conduits and the method comprises computing the theoretical plate height ($H_{disp}$) due to the inhomogeneities of the packing based on the relationship:

$$H_{disp} = 0.778 * \frac{v_0 * \left(FKD * SigmaD^2 + FKE * SigmaE^2 + FKL * SigmaL^2\right) * (d_c + d_e)^2}{FDiff * FDil * (1 + k') * 2}$$

wherein $v_0$ is the elution velocity of a non-retained compound by the stationary phase $$FKD = \left(\frac{2 + 3*k'}{1 + k'}\right)^2$$

$$FKE = \left(\frac{k_0 * PB}{(1 + k_0)}\right)^2$$

$$FKL = 4$$

$$k_0 = \frac{(f_{VolStat} * K + P) * d_e * (2 * d_c + d_e)}{d_c^2}$$

$$PB = \frac{(2 * d_c + 2 * d_e)}{(2 * d_c + d_e)}$$

$$Fdiff = \frac{d_c + d_e}{\frac{d_c}{DC} + \frac{d_e}{DE}}$$

$$DC = \frac{d_c * d_c * D_0 + [(d_c + d_e) * (d_c + d_e) - d_c * d_c] * DE}{(d_c + d_e) * (d_c + d_e)}$$

$$DE = \frac{D_0 * P * C * (P + f_{VolStat})}{T * (P + f_{VolStat} * K)} + \frac{D_s * f_{VolStat} * C * K * (P + f_{VolStat})}{T * (P + f_{VolStat} * K)}$$

$$FDil = \frac{d_c^2}{(d_c^2 + ((d_c + d_e)^2 - d_c^2) * (P + f_{VolStat} * K))}$$

C is a correction coefficient of the diffusivity in a free medium related to the size of the pores and to the diameter of the molecules to be separated.

* * * * *